(12) United States Patent
Grossman et al.

(10) Patent No.: US 7,555,257 B2
(45) Date of Patent: Jun. 30, 2009

(54) STOCK CHANNEL AND NEWS CHANNEL

(75) Inventors: Joel K. Grossman, Seattle, WA (US);
Kent H. Skinner, Kirkland, WA (US);
Albert W. Tan, Redmond, WA (US);
Yingli Wang, Issaquah, WA (US); Roger Colin Miller, Sammamish, WA (US);
Paul J. VanderSpek, Seattle, WA (US);
Keith Curtis, Seattle, WA (US); Dane M. Howard, Sammamish, WA (US);
James W. Cooley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 740 days.

(21) Appl. No.: 10/903,710

(22) Filed: Jul. 30, 2004

(65) Prior Publication Data
US 2006/0026088 A1  Feb. 2, 2006

(51) Int. Cl.
*H04H 1/00* (2006.01)
(52) U.S. Cl. .................. 455/3.01; 455/3.06; 455/414.3; 455/418
(58) Field of Classification Search .......... 455/418, 455/419, 3.01, 4.06, 405, 3.03, 3.06, 425, 455/412.1, 414.1, 414.2, 414.3, 420, 406, 455/407; 709/224, 227; 705/37
See application file for complete search history.

(56) References Cited

U.S. PATENT DOCUMENTS

| | | | |
|---|---|---|---|
| 5,440,632 A | 8/1995 | Bacon et al. ................ 380/20 |
| 5,442,646 A | 8/1995 | Chadwick et al. ........... 714/795 |
| 5,793,301 A * | 8/1998 | Patterson et al. ............ 340/7.23 |
| 5,854,985 A | 12/1998 | Sainton et al. .............. 455/553 |
| 6,014,606 A | 1/2000 | Tu ............................. 701/200 |
| 6,212,414 B1 | 4/2001 | Alameh et al. .............. 455/575 |
| 6,272,332 B1 | 8/2001 | Matsumoto et al. ....... 455/412.1 |
| 6,363,419 B1 | 3/2002 | Martin, Jr. et al. .......... 709/219 |
| 6,373,374 B1 | 4/2002 | Siemens ................. 340/309.8 |
| 6,389,473 B1 | 5/2002 | Carmel et al. ............... 709/231 |
| 6,480,783 B1 | 11/2002 | Myr ............................ 701/117 |

(Continued)

FOREIGN PATENT DOCUMENTS

WO        WO 99/35778        7/1999

OTHER PUBLICATIONS

D. Burke, "The FM Wristwatch Radio", http://www.nvg.ntnu.no/Sinclair/radiowat.htm, last accessed Jul. 11, 2001, 1 page.

(Continued)

*Primary Examiner*—Tan Trinh
(74) *Attorney, Agent, or Firm*—Merchant & Gould, P.C.

(57) ABSTRACT

The present invention provides a stocks channel and a news channel to a user on a mobile device. Stocks based content associated with a stocks channel and news content associated with the news channel is automatically delivered and stored on a mobile electronic device for access by a user. Using the device, users can quickly access the stock and news information without having to type in information, or specifically request the information to be downloaded to the device. The stock channel and the news channel provides a quicker and less cumbersome way of accessing stock and news information than having to access a web site, a television, a radio station, or a telephone service.

28 Claims, 20 Drawing Sheets

U.S. PATENT DOCUMENTS

| | | | |
|---|---|---|---|
| 6,522,875 B1 | 2/2003 | Dowling et al. | 455/414 |
| 6,564,381 B1 | 5/2003 | Hodge et al. | 725/97 |
| 6,618,593 B1 | 9/2003 | Drutman et al. | 455/456.3 |
| 6,703,930 B2 | 3/2004 | Skinner | 340/539 |
| 6,714,486 B2 | 3/2004 | Biggs | 368/82 |
| 6,853,911 B1 | 2/2005 | Sakarya | 701/208 |
| 6,879,847 B1 | 4/2005 | Kato et al. | 455/566 |
| 6,883,019 B1 | 4/2005 | Sengupta et al. | 709/206 |
| 6,973,318 B2 | 12/2005 | Jambhekar et al. | 455/456.1 |
| 7,017,105 B2 | 3/2006 | Flanagin et al. | 714/798 |
| 7,079,452 B2 | 7/2006 | Harrison | 368/82 |
| 7,092,703 B1* | 8/2006 | Papineau | 455/418 |
| 7,113,981 B2 | 9/2006 | Slate | 709/217 |
| 7,287,097 B1 | 10/2007 | Friend et al. | 709/248 |
| 7,366,546 B2* | 4/2008 | Grossman et al. | 455/566 |
| 7,383,037 B2* | 6/2008 | Grossman et al. | 455/414.1 |
| 2001/0056578 A1 | 12/2001 | Hwang et al. | 725/98 |
| 2002/0012010 A1* | 1/2002 | Pasquali | 345/719 |
| 2002/0032755 A1 | 3/2002 | Abrahams et al. | 709/219 |
| 2002/0058520 A1 | 5/2002 | Nakagawa | 455/456 |
| 2002/0090934 A1 | 7/2002 | Mitchelmore | 455/412 |
| 2002/0095458 A1 | 7/2002 | Silverstein et al. | 709/203 |
| 2002/0099452 A1 | 7/2002 | Kawai | 700/16 |
| 2002/0128000 A1 | 9/2002 | do Nascimento, Jr. | 455/414 |
| 2002/0142268 A1 | 10/2002 | Dutta et al. | 434/106 |
| 2002/0160805 A1 | 10/2002 | Laitinen et al. | 455/550 |
| 2003/0007012 A1 | 1/2003 | Bate | 345/825 |
| 2003/0028451 A1 | 2/2003 | Ananian | 705/27 |
| 2003/0046291 A1* | 3/2003 | Fascenda | 707/10 |
| 2003/0069029 A1 | 4/2003 | Dowling et al. | 455/456 |
| 2003/0130898 A1 | 7/2003 | Pickover et al. | 705/26 |
| 2003/0130926 A1* | 7/2003 | Moore et al. | 705/37 |
| 2003/0228910 A1 | 12/2003 | Jawaharlal et al. | 463/42 |
| 2004/0021555 A1 | 2/2004 | Faris | 340/7.52 |
| 2004/0043760 A1 | 3/2004 | Rosenfeld et al. | 455/413.3 |
| 2004/0135671 A1* | 7/2004 | Khoshbin et al. | 340/7.53 |
| 2004/0181819 A1 | 9/2004 | Theiste et al. | 725/146 |
| 2004/0203674 A1 | 10/2004 | Shi et al. | 455/415 |
| 2004/0204143 A1 | 10/2004 | Chen | 455/566 |
| 2004/0224662 A1 | 11/2004 | O'Neil et al. | 455/408 |
| 2005/0027676 A1 | 2/2005 | Eichstaedt et al. | 707/1 |
| 2005/0186940 A1* | 8/2005 | Schatzberger et al. | 455/406 |
| 2005/0188078 A1* | 8/2005 | Kotzin et al. | 709/224 |
| 2005/0221821 A1 | 10/2005 | Sokola et al. | 455/432.3 |
| 2005/0245243 A1 | 11/2005 | Zuniga | 455/414.3 |
| 2005/0256797 A1* | 11/2005 | Tyulyaev | 705/37 |
| 2006/0063567 A1 | 3/2006 | Grossman et al. | 455/566 |

OTHER PUBLICATIONS

S. Reedy, "Sinclair Watch Radio", http://www.somerset.net/arm/transistors/Sinclair.html, last accessed Jul. 11, 2001, 4 pages.

Ambient Devices, http://www.ambientdevices.com/cat/platform.html, last accessed Sep. 5, 2002, 2 pages.

Ambient Devices, http://www.ambientdevices.com/cat/applications.html, last accessed Sep. 5, 2002, 3 pages.

E. Mueller, "A Calendar with Common Sense", ACM 2000, pp. 198-201.

B. Azvine et al., "The Intelligent Assistant: An Overview", Intelligent Systems and Soft Computing, LNAI 1804, Springer-Verlag, 2000, pp. 215-238.

T. Payne et al., "Calendar Agents on the Semantic Web", IEEE Intelligent Systems, May-Jun. 2002, 5 pgs.

S. Nylander et al., "Providing Device Independence to Mobile Services", User Interfaces for All, LNCS 2615, Springer-Verlag, 2003, pp. 465-473.

M.T. Raghunath et al., "User Interfaces for Applications on a Wrist Watch", Springer-Verlag, Personal and Ubiquitous Computing, vol. 6, 2002, pp. 17-30.

S. Mann, "'Smart Clothing': Wearable Multimedia Computing and 'Personal Imagining' to Restore the Technological Balance Between People and Their Environments", ACM Multimedia, 1996, pp. 163-174.

S. Barnes et al., "Rising Sun: iMode and the Wireless Internet", Communications of the ACM, vol. 46, No. 11, Nov. 2003, pp. 79-84.

S. Acharya et al., "Balancing Push and Pull for data Broadcast", Proceedings of ACM SIGMOD Conference, May 1997, pp. 1-12.

C. H. Leung et al., "Analysis of Mobile Commerce Market in Hong Kong", ACM, ICEC 2003, pp. 408-412.

G. Samaras et al., "Personalized Portals for the Wireless User Based on Mobile Agents", WMC '02, Sep. 28, 2002, pp. 70-74.

Timex—Data Link, http://www.timex.com/html/data_link.html, last accessed Sep. 8, 2004,.

Traffic Gauge (tm) Mobile Traffic Map, http://www.trafficgauge.com/, last accessed Sep. 8, 2004, 2 pages.

ESPN.com, http://sports.espn.go.com/ncf/scoreboard, last accessed Dec. 16, 2004, 8 pages.

Free Daily Overview Horoscope, Astrology.com, http://horoscopes.astrology.com/dailysagittarious.html?arrivalSA=1&cobrandRef=0&arriv . . . , last accessed Dec. 16, 2004, 3 pages.

MSN Money— Financial Site, http://moneycentral.msn.com/home.asp, last accessed Dec. 16, 2004, 2 pages.

Yahoo Finance, http://finance.yahoo.com, last accessed Dec. 16, 2004, 3 pages.

AT&T Wireless, http://www.attwireless.com/personal/features/mmode/mmodeguide/content.jhtml, last accessed Dec. 16, 2004, 8 pages.

Moviefone: Who is Mr. Moviefone, http://movies.channel.aol.com/franchise/reeldeal/mrmoviefonbio.adp, last accessed Dec. 16, 2004, 4 pages.

AvantGo, Inc., http://www.avantgo.com/frontdoor/learn_more.html, last accessed Dec. 16, 2004, 3 pages.

MSN Mobile, http://mobile.msn.com/ac.aspx?cid=uuhp_alerts, last accessed Dec. 16, 2004, 2 pages.

AccuWeather, http://www.accuweather.com/adcbin/public/index.asp?partner=accuweather, last accessed Dec. 16, 2004, 3 pages.

weather.com, http://www.weather.com/weather/local/98101?lswe=98101&lwsa=WeatherLocalUndecla . . . , last accessed Dec. 16, 2004, 4 pages.

Yahoo! Mobile, http://mobile.yahoo.com/?nosplash=1, last accessed Dec. 16, 2004, 2 pages.

* cited by examiner

*Channel Customization*

Sign In

Home | Channels | Your Location | Your Account

News
Get the latest news delivered to you! Choose the news sources that are important to you and receive the articles in an easy-to-read format.

Business Headlines
☑ AP Business   ☐ MSNBC Business   ☐ MSNBC Stock Market News

Entertainment News
☑ AP Business

Headline News
☑ AP News   ☐ Reuters News   ☐ Front Page News

International News
☑ AP International   ☐ MSNBC International   ☑ Reuters International

Local News
☑ Local News (Seattle)

Sports News
☑ AP Sports   ☐ Reuters Sports

Technology News
☑ Reuters Science   ☐ MSNBC Technology

Weather News
☑ MSNBC Weather

☑ BREAKING NEWS - Receive alerts about breaking news and keep current with important events! Alerts are sent as messages to the Messages channel.

[ Save ]  [ Cancel ]

Channel Customization

Home | Channels | Your Location | Your Account | [Sign In]

Latest News

View Headlines Received

[Today ▼] [Go]

| Headline | Date | Category |
|---|---|---|
| Headline 1 Abstract Read full article | 5/1/2004 10:26 am | Source 1 |
| Headline 2 Abstract Read full article | 5/1/2004 9:36 am | Source 2 |
| Headline 3 Abstract Read full article | 5/1/2004 7:18 am | Source 1 |
| Headline 4 Abstract Read full article | 5/1/2004 5:02 am | Source 4 |
| Headline 5 Abstract Read full article | 5/1/2004 3:48 am | Source 5 |

STOCK CHANNEL AND NEWS CHANNEL

BACKGROUND OF THE INVENTION

Mobile electronic devices, such as cell phones, wireless PDAs, wireless laptops and other mobile communication devices are making impressive inroads with consumers. Many of the mobile electronic devices are able to perform a variety of tasks and include a user interface to help the user access the features associated with the device. For example, some mobile devices include a display unit that displays graphical data to support email, instant messaging, web browsing, and other non-voice features. Using their mobile devices, users access the Internet, send and receive email, participate in instant messaging, and perform other operations. Accessing the desired information, however, may be cumbersome for the user. When accessing the Internet, for instance, users have to log onto the network and then type in information to access the information they desire. Additionally, using the user interface on the mobile device may be difficult. For instance, mobile devices typically do not have a good mechanism for inputting data.

SUMMARY OF THE INVENTION

The present invention is directed at providing a stocks channel and a news channel to a user on a mobile device.

According to one aspect of the invention, stocks based content associated with a stocks channel and news content associated with the news channel is automatically delivered and stored on a mobile electronic device for access by a user. Using the device, users can quickly access the stock and news information without having to type in information, or specifically request the information to be downloaded to the device. The stock channel and the news channel is directed at providing a quicker and less cumbersome way of accessing stock and news information than having to access a web site, a television, a radio station, or a telephone service.

According to another aspect of the invention, the stocks channel and news channel include several different displays for showing different types of stock and news information. Some stock information that may be displayed includes: stock quotes for stocks configured by a user; composites for the major market indices; graphical displays showing stock movement, market news, and the like. Some news information that may be displayed includes: top stories, breaking news, business news, sports news, entertainment news, and the like.

According to yet another aspect of the invention, the user may customize the stock and news information they receive. For example, the user may select from a list of available stocks from many different stock exchanges. The user may also select from a variety of news sources from which to obtain news information.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

FIG. 10 illustrates a web user interface for inputting user preferences for a news channel;

FIG. 11 illustrates a web interface to view an entire article that has been delivered to a user's device;

DETAILED DESCRIPTION OF THE PREFERRED EMBODIMENT

The apparatus, system, and method of the present invention are related to navigating through a stock channel and a news channel on a device that includes stored stock and news related information. Content that is associated with the stock channel and the news channel may be selected and viewed on a display of the device by means of passive interaction (e.g., hands free operation) or active interaction (e.g., selecting buttons).

In the described embodiments, the electronic devices may be mobile devices, such as smart watches, that are specially configured to receive communication signals. The electronic devices may be configured to receive broadcast transmissions from one or more broadcast towers and are capable of receiving and processing messages from the broadcast transmissions. The electronic devices store the received information such that the information is dynamically indexed according to designated channels. In other words, the location of the stock data or news data in a transmission can vary from one transmission to another. Each channel includes content that is organized according to a set of criteria. For example, stocks content is presented in one channel; wherein news content is presented in another channel. Some channels may include content from one or more of the other channels. For example, the stocks channel may include some news content that is also included on the news channel. After information is received and processed by the client device, a user may passively or actively review the information that is stored in the electronic device.

Two of the particular channels correspond to a stocks channel and a news channel. The stocks channel and the news channel on each device may be customized based on user preferences such that the user experience is enhanced. An example stocks channel may be configured to display information relating to certain stocks that a user has selected. An example news channel may be configured to display news from selected news sources and on genres of news content (e.g. business, local, entertainment, national, international, etc.).

Although described here in the context of a watch-based system, other mobile or non-mobile devices, such as portable and desktop computers, personal digital assistants (PDAs), cellular telephones, and the like, may be used. The use of a watch is for illustrative purposes only to simplify the following discussion, and may be used interchangeably with "mobile device" and/or "electronic device".

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

Exemplary Smart Object Device

Figure 2:
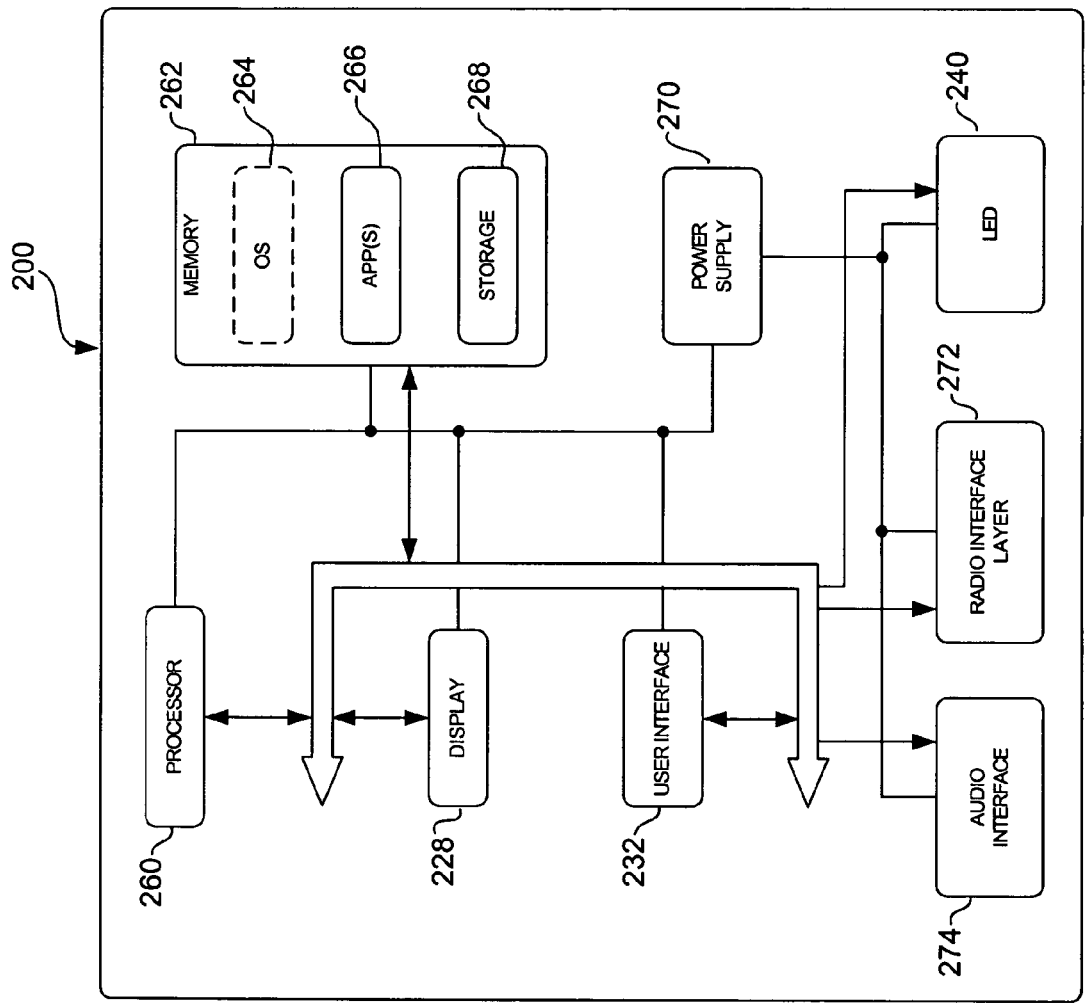
FIG. 2 shows an electronic device.
Figure 3:
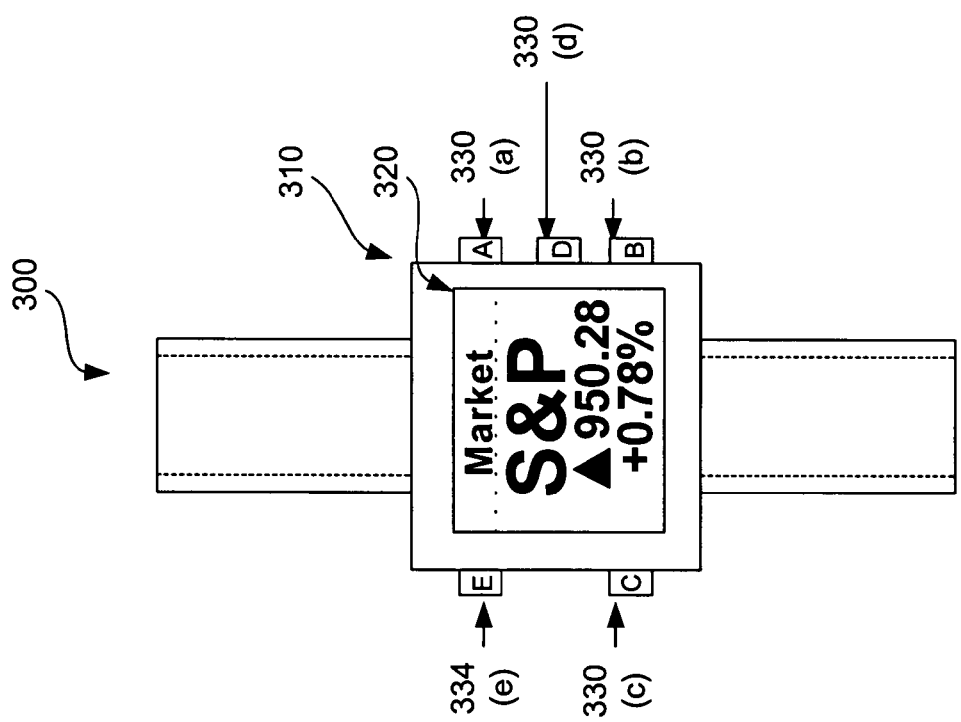
FIG. 3 illustrates an exemplary smart object watch devices that include a user interface for navigating through channels and content.

FIG. 3 illustrates an exemplary smart device that includes a user interface that is configured to interact with content from channels, in accordance with aspects of the invention. Watch device 300 includes bezel 310 which has an electronic system. The electronic system performs the functions in a manner that is consistent with the hardware that is described with respect to FIG. 2. Bezel 310 includes display 320, such as a liquid crystal display, a multiple bit display, or a full color display. In one embodiment, watch hands are electronically generated on display 320 when the user is in a time mode. In an alternative embodiment, the bezel includes analog-type watch hands that do not detrimentally interfere with display 320. As illustrated, display 320 shows an S&P market quote.

Watch device 300 includes a series of selectors, such as buttons A-D (330a-d), which are arranged to operate as part of a user interface (UI). Each selector may have a default function and/or a context determined function. The currently selected channel determines the context for each selector. Alternatively, the currently active display may determine the context for each selector. For example, a display screen (e.g., a help screen) may be superimposed on the main display such that the display screen becomes the active context. Watch device 300 is context sensitive in that the function that is associated with each selector may change based on the selected channel or display screen.

Button "A" has a default function of page up or previous page in the currently selected channel. Button "A" may also have an alternate function based on the currently selected channel or display. For example, button "A" may be configured to activate a speed list browse function after button "A" is activated for a predetermined time interval. In the speed list browse function, a pop-up visual cue (e.g., a pop-up window) may be used to indicate how that list is indexed. Each record (e.g., a list of stocks, a list of indexes, etc.) can be indexed many different ways, including by price, alphabetically, by date, categories, or any other way of indexing a record. List browse indexing allows a user to quickly access records located within the list.

Button "B" has a default function of page down or next page in the currently selected channel. Button "B" may also have an alternate function based on the currently selected channel or display. In one example, button "B" is activated for a predetermined time interval (e.g., two seconds) to select a "speed list browse" function.

Button "C" has a default function of next channel. Button "C" may also have an alternate function based on the currently selected channel or display. In one example, button "C" is activated for a predetermined time interval (e.g., two seconds) to select the main channel or "primary" channel. The main channel in an example watch device is the time channel that provides the user with time related information. However, devices may be configured to have some other display screen that is recognized by the device as a "primary" channel or "home" location.

Button "D" has a default (or "primary") function of "enter." The "enter" function is context sensitive and used to select the "enter" function within a selected channel (e.g., enter a details view), or to select an item from a selection list (e.g., select a movie within the movie view list browse). Button "D" may also have an alternate function based on the currently selected channel or display. For example, the "D" selector is activated for a predetermined time interval (e.g., two seconds) to activate a delete function. In another example, the "D" button may be selected for a predetermined time to activate a help screen or an additional set mode. In this example, the help screen remains active while button "D" is activated, and the help screen is deactivated (e.g., removed from the display) when the "D" button is released.

The selectors are arranged such that the electronic device accomplishes navigating and selecting content on each channel in a simple manner. An optional fifth selector (e.g., button "E") may be arranged to provide other functions such as backlighting or another desired function. Other selectors may also be included. For example, an optional sixth selector (not shown) may be arranged to operate as a "channel back" function such that navigation through channels may be accomplished in a forward and reverse direction.

Stocks Channel and News Channel

The stocks channel and news channel are arranged to provide a user of a mobile electronic device simple access to news and stock information. The news information may include information such as international news, headline news, sports news, health news, local news, and the like. The stocks information may include information such as current stock prices, price change in a day, volume of trading for a day, stock prices spanning a predetermined number of days, major index values, market information, after hours quotes, stock split announcements, upgrades/downgrades; and the like. The stock and news information may be customized for each electronic device based on user preferences. The user preferences may be provided as information that is retrieved from broadcast transmissions such as described herein.

Users are able to view current day stock quotes information for stocks which they have selected. Users may also personalize the stock information and news information they receive. For example, a user may choose the stocks that they most care about providing them with an indication of how their personal finances are performing each day. Users may also compare their selected stocks with how the rest of the market is performing. According to one embodiment, the top moving stocks are delivered to the user. This stock information provides the user with information such as what stocks were hot and cold for a particular day. According to another embodiment, a user may add a stock related event to a calendar on their device. For example, a user may add an earnings report date to their device.

While configuring the stocks channel, users may select a stock by name, ticker symbol, and the like. Other items of stock information that may be delivered to the device include: information on market events; stock tips; and the like. Users may also set notification rules and/or thresholds when they should be notified. The configured stock information is then automatically delivered to the device based on the configuration of the stocks channel. In this way, only the stock information the user desires is delivered to the device. Additionally, once the stock channel is configured, the user does not have to request that the same information be delivered to the device again.

Users may also choose the news information they are most interested in receiving. For example, a user may select to receive national news and sports news. While using the news channel, users may scroll through the news stories delivered to their device. Users may also receive breaking news, or news alerts, on their device.

Exemplary Displays

FIGS. 7-16 are diagrams illustrating example views for various modes associated with a stocks channel and news channel that is arranged in accordance with the present invention.

Figure 7:
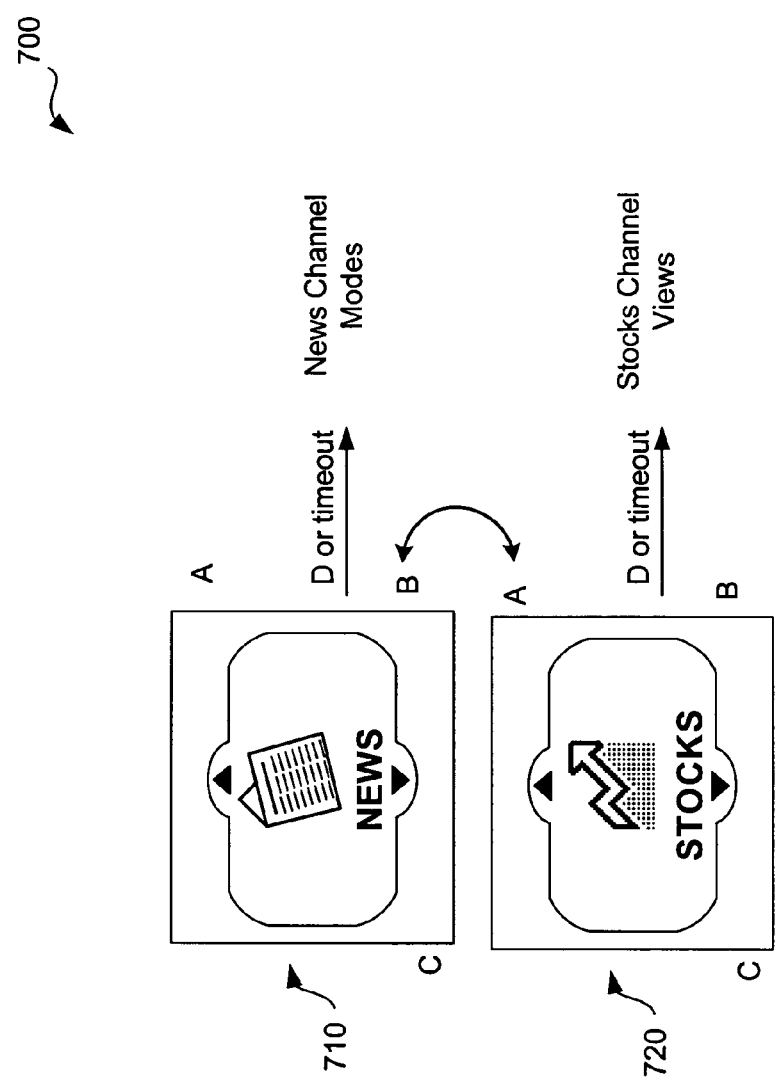
FIG. 7 shows an exemplary stocks channel and news channel displays.

FIG. 7 shows exemplary stocks channel and news channel displays, in accordance with aspects of the invention. The stocks channel and news channel may be configured for multiple operating modes. According to one embodiment, the news channel includes two modes: a news stories mode and a news settings mode (See FIG. 8 and related discussion). According to one embodiment, the stocks channel includes a single mode (See FIG. 12 and related discussion). More or fewer modes may be configured for each of the channels. For example, the stocks channel could include separate modes for quotes, news, alerts, and the like.

News channel splash-screen 710 is displayed when the news channel is initially selected. Stocks channel splash-screen 720 is displayed when the stocks channel is initially selected.

After the stocks channel or news channel is selected, a view is activated by the expiration of a timeout period (e.g., two seconds) without user interaction, or by activation of the "D" or "enter" selector. The channel splash can be activated from any one of the mode splash screens by activation of the "C" selector.

A mode splash-screen is displayed whenever the mode is changed on the device. In one example, the mode may be changed by selective activation of the next and previous selectors (e.g., the "B" and "A" buttons) when any mode splash screen is active. The mode splash screen may be dismissed via a timeout condition or by activation of the "D" selector (or enter function). Each mode has a series of associated views. The channel splash-screen is dismissed after a mode is activated.

Figure 8:
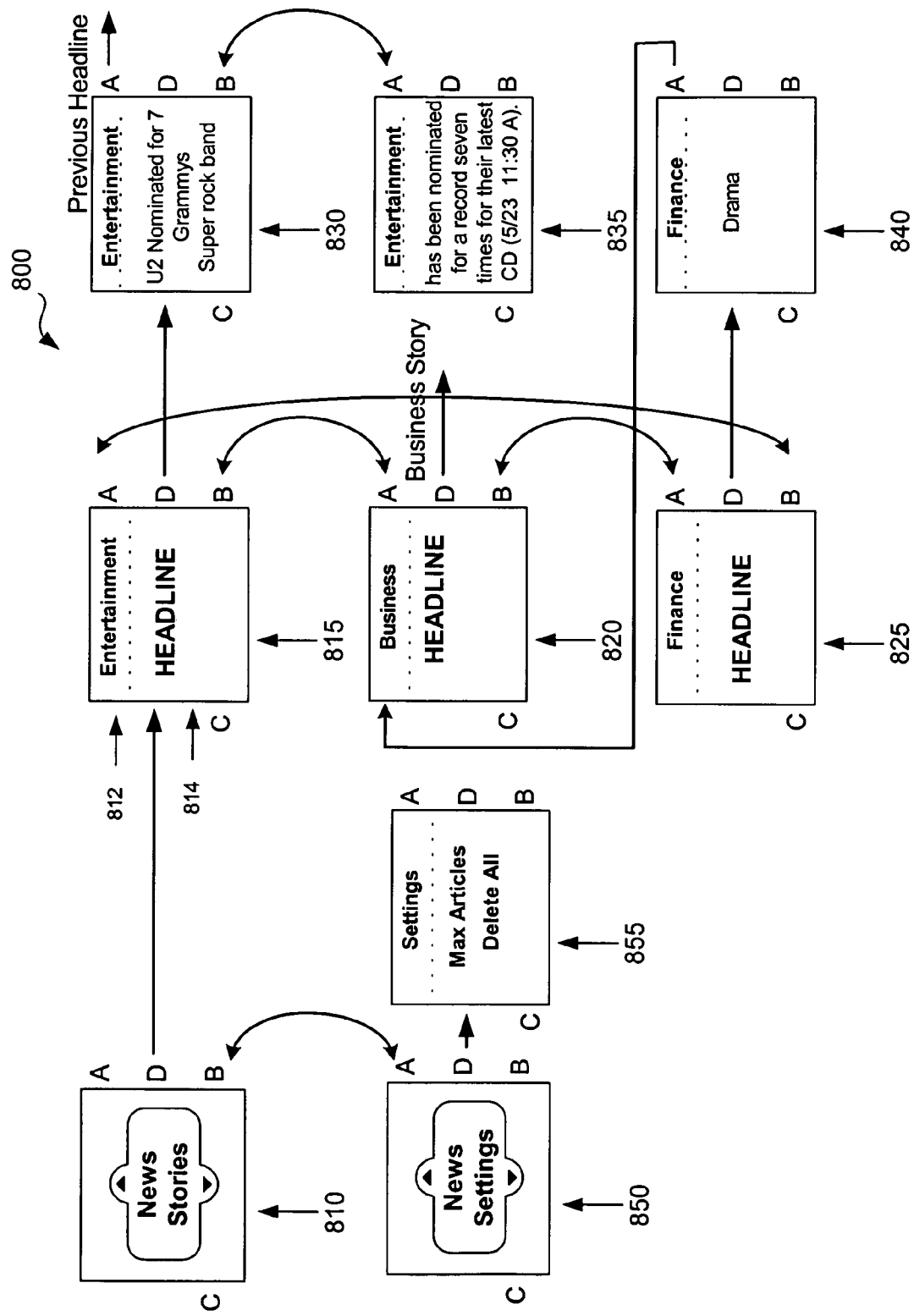
FIG. 8 shows views associated with a news channel.

FIG. 8 shows views associated with a news channel, in accordance with aspects of the invention. When the news stories mode is activated, splash screen 810 may be displayed. According to one embodiment, the device immediately enters the news stories mode without displaying the splash screen. According to another embodiment, after the news stories splash-screen is dismissed, the device enters the news stories mode. Generally, the news stories mode of the news channel includes many display views that correspond to different news stories obtained from sources selected by a user during configuration of the news channel.

When the news settings mode is activated, news settings splash screen 850 is displayed. After the news settings splash-screen is dismissed, the device enters the news settings mode. Generally, the news setting mode allows a user to set a maximum number of news stories to be shown as well as an option to delete all of the news stories form the device. According to one embodiment, the maximum number of news articles buffered on a device at any time is 10, 15, or 20. By default, the device will buffer 10 news articles at one time with the oldest news article being replaced when new stories come in.

The news stories mode (810) allows a user to view the news received on their device. When the user is traveling and has elected to receive regional news, the news stories delivered to their device will be based on their current location without the users having to change any configuration.

After selecting the news stories mode (810), a glance view of a news story is displayed (e.g. 815, 820, and 825). The glance view provides the user with a headline of the news story.

The user may navigate through the headlines by selecting the previous "A" or next "B" buttons. The previous "A" button sets the view to the previous news story. If the currently selected news story is the first item of the list then the last item on the list is selected. Similarly, selecting the "B" button advances the selection to the next story. When the selected story is the last story then the first story is selected. If the user is currently viewing the last news story, pressing the "B" button moves the user to the first news story in the list. Similarly, pressing the "A" button moves the user to the last news story in the list when they are currently viewing the first story.

The user may enter a details view of the news story by selecting the details "D" button. The details view (930, 940, and 950) displays more of the news story than just the headline. Selecting the "D" button from any screen switches between headlines view and details view. Once the details button is selected, the news story is shown. When the news story takes more space than a single screen the story will continue onto another screen (See 830 and 835). The user can navigate to next/previous parts of a news story using the A and B buttons.

Figure 6:
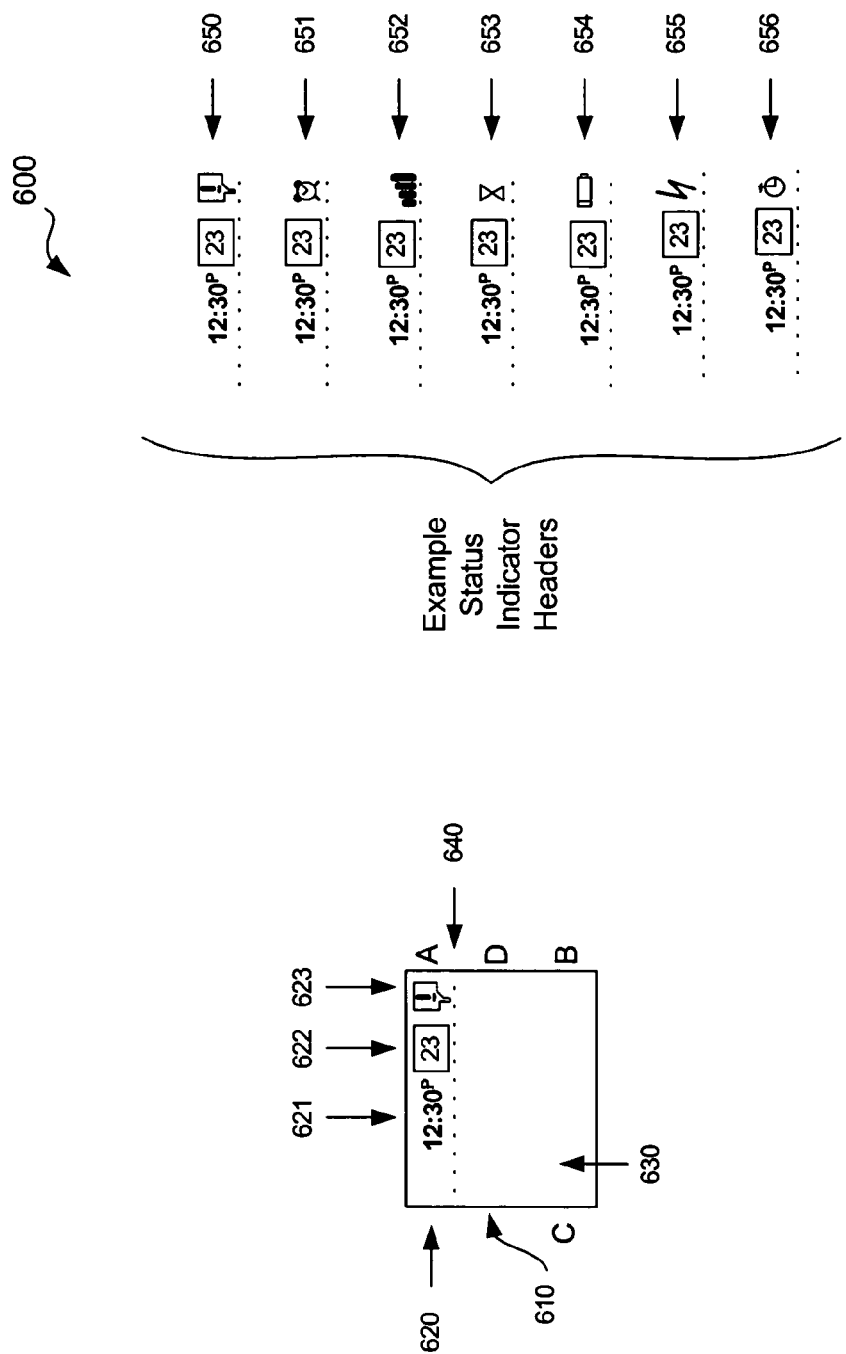
FIG. 6 shows exemplary status indicator headers.

The header section (812) displays the type of news for a predetermined period of time and then is replaced with another header, such as the headers displayed in FIG. 6. According to one embodiment, the device enters auto-glance mode and automatically cycles through the headlines without user interaction. For example, after a predetermined period of inactivity (i.e. 5 seconds) the device displays the next available headline. The news story headlines continue to advance until the user selects a story.

The news stories delivered to the device consist of the titles and abstracts from news feeds that are edited and formatted for presentation on the Internet. Generally, the news titles are about 30 characters long and the abstracts are about 300 characters in length. News stories are updated throughout the day. Some of the news categories that the user may select from include: National; International; Local; Business; Sports; Weather; Technology; Home and Family; Health; Travel; Living; Stock Market; and Entertainment. Users may configure and prioritize the news that they receive on their device.

By default, the device receives the following news categories: National/Headline: from AP; International: from AP; Local Business: from AP. Typically, local news can be gathered from several local sources. In the default configuration, there is one local news source that is selected. If the user does not have a local news source (for example, cities that do not have local news) then this news source is not available.

While the user is on the first page of a news story in the details view, pressing the previous "A" button changes the view to the previous headline. If the user is in the middle of reading an article ($2^{nd}$ page +) then pressing the previous button "A" changes the display to the previous detail view page (See 835 to 830).

The user may delete a news story by pressing and holding the "D" button while in the details view or by deleting the news stories using the news settings mode. When the user holds the "D: button, the text of the news article is replaced with a picture of a trash can (not shown) that progressively drawn with a vertical wipe. If the user does not hold the "D" button until the trash can has fully drawn, the story will not be deleted. In this way the user may change his mind before the story is erased off of the device. In the news settings mode, the user selects Delete ALL which after confirmation deletes all of the news stories from the device.

Figure 9:
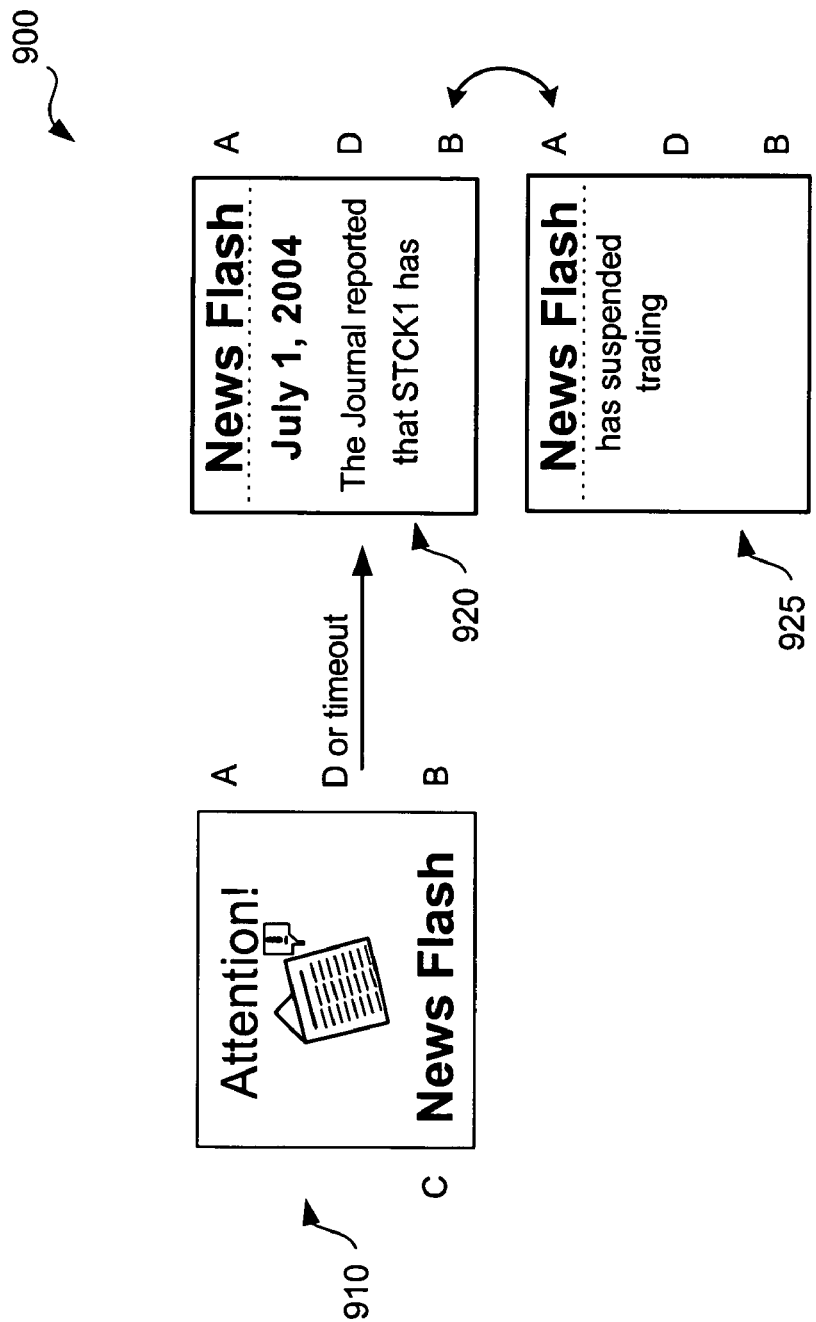
FIG. 9 illustrates a news flash.

FIG. 9 illustrates a news flash, in accordance with aspects of the present invention. Some broadcast news stories are presented as notifications. These are news stories which are typically breaking news stories that are generally important events. Some of the news flashes may be news stories, while other news flashes may be alerts, such as Amber Alerts for missing children, national emergency system alerts, and the like. According to one embodiment, the news flashes are delivered to the device and presented in a messages channel. Alternatively, the news flashes may be presented in the news channel.

FIG. 10 illustrates a web user interface for inputting user preferences for a news channel, in accordance with aspects of the invention.

News sources can be selected via a computer type interface such as through an internet based application, a computer based application, or any other reasonable method of accessing and altering configuration information. In one embodiment, a subscriber to the news channel can accesses web page 1000 to select or change various features associated with the news channel. In another embodiment, news sources already selected on a user's Internet home page may be retrieved from the user's home web site and then used to select the available news sources.

All of the available news sources can be selected or unselected. When the user unselects all of the news sources, the channel is not shown on the device.

When configuring the news channel, the user can also select one or more sources for each of the categories. The user can select as many sources for a category as they want. The following is an exemplary list of news sources: Business (Business Week, AP-Business, Reuters—Business, MSNBC Business News, CNBC; Wall Street Journal); Entertainment (MSN Entertainment News, AP-Entertainment, Reuters—Entertainment); Headline (AP, Reuters, Front Page News, Top Stories, Washington Post); Sports (Sporting News—Sports, AP—Sports, Reuters—Sports); World News/Int'l (Reuters—International, AP International, MSNBC International); Health (WebMD, MSNBC—Health); Home and Family (MSNBC Family News); Technology (MSNBC Technology, Reuters (Science), Reuters (Space), Reuters (Technology), Space.com); Travel (MSNBC Travel (Business), MSNBC Travel (Promotions), MSNBC Travel (Security)); Stocks (MSNBC Stock Market Report); Weather (Top Weather stories); Living (MSNBC Living); and Local (local stations).

The user can also select to receive breaking news which provides the user with News flashes for important events. When the user selects the save button the changes are made to the news channel. The user can return to the web site at anytime and change the selection of the categories.

FIG. 11 illustrates a web interface to view an entire article that has been delivered to the user's device, in accordance with aspects of the present invention.

A web page allows the user to view the entire story of a story that has been delivered to the device. When accessing web page 1100, the user can see all the current news items in the same view that they have on their device. According to one embodiment, the articles remain on the website for three days. The user can select the day by using the drop down list. Based on the drop down list the headlines and stories contained in the web page are updated. The user may come up to the web site for more information on an article well after the article was removed from the current broadcast list. When the user desires to view an article in its entirety, they can select the link "Read full article" at which point they will be directed to the news story.

Stocks Channel

Figure 12:
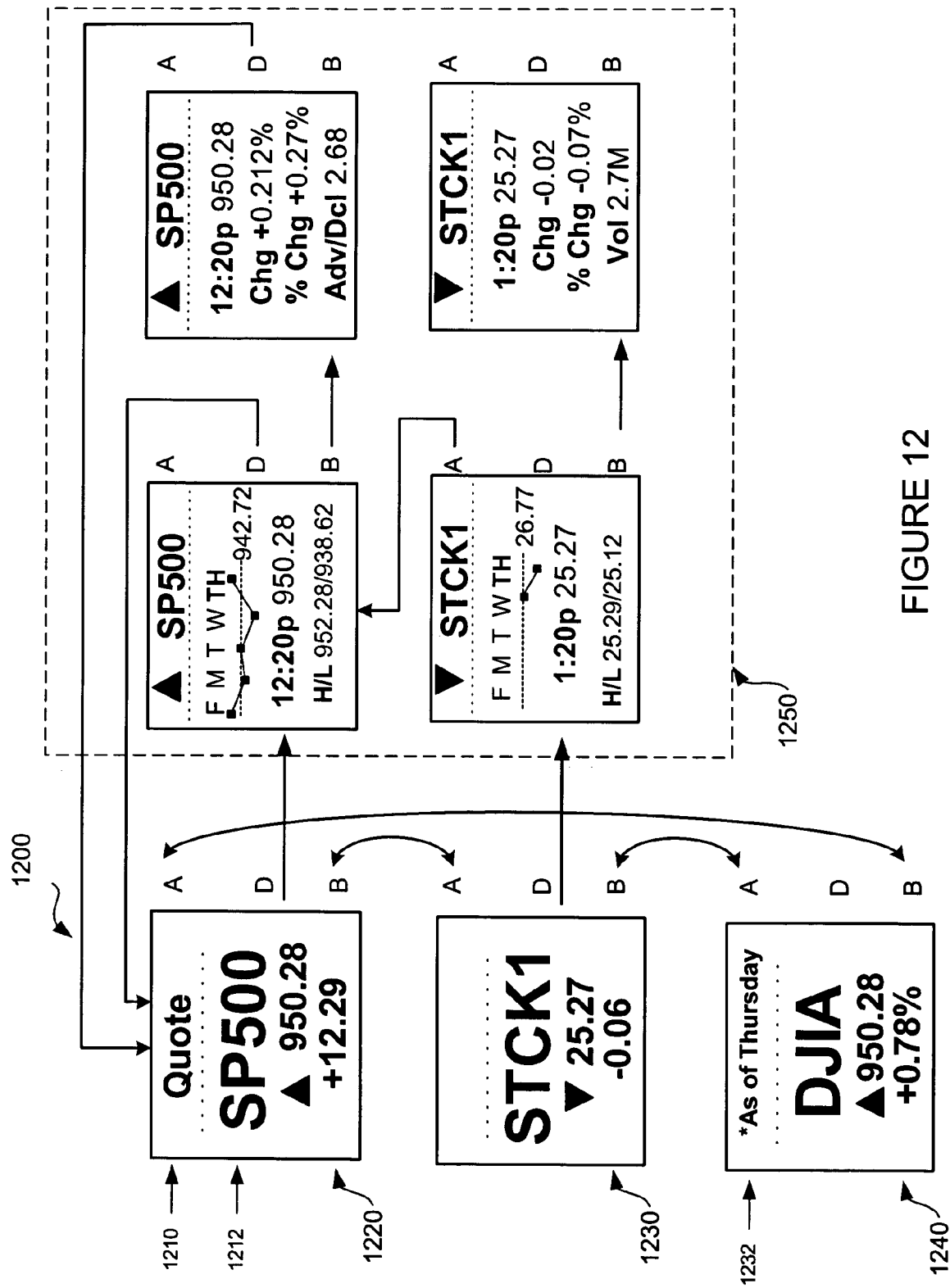
FIG. 12 illustrates exemplary stock views.

FIG. 12 illustrates exemplary stock views 1200, in accordance with aspects of the invention. According to one embodiment, the stocks channel includes a quotes mode. Other modes may also be included with the stocks channel. For example, a market briefing mode may be included (See FIG. 14). Each stock view may be partitioned into a header section (1210), and a main body section (1212). The header section may display a title for the current view, an indication of how the market or stock is performing, the current time or date, or some other information. As illustrated in the figure, some header sections include a graphical arrow (up or down) indicating how the market is performing.

The header section of the display screen may change from the one header view to another header view. For example, after a predetermined delay time, the header section may change from a title to a time of day header. The main body section of each stock view indicates the name of the market or stock being tracked along with some corresponding stock information. The main body section may include a combination of text and graphic elements that are centered on the display both horizontally and vertically beneath the header section. Similar to the header section, the main body section of the display area may be periodically updated. For example, the change in stock performance may be displayed as a percentage change for one period of time and then as a point change for another period of time.

The electronic device may be arranged to apply a logic rule set to dynamically change the content that is associated with the header and main body sections of the display.

While the user is viewing the glance views for the stock channel (1220, 1230, and 1240) activation of the previous and next selectors (e.g., the "A" and "B" buttons) changes the view to the previous or next glance stock view. The list is arranged as a circular list, in which pressing the "A" button when at the beginning of the list navigates the user to the stock at the end of the list.

Selecting the "D" button from any glance screen navigates the user to a detailed view of the stock. While in the detail mode, selecting the "D" button returns the user to the glance view for the stock.

According to one embodiment, the current day stock quotes include the following information: Stock quote, percent change; trading volume; timestamp; price change; High/low alerts. Some additional information that may be included are items such as: Earnings announcements; Earnings warnings; and Upgrades and Downgrades.

Major indices and stock changes information (See 1220 and 1240) includes items such as: Exchange level, change, percent change. Other stock information that may be tracked includes items such as 10-yr Bond: price, change, yield; Most active finance: ticker, change, percent change; NYSE: Volume, and world indices.

The user may use the stocks channel to track items such as: Personalized stock and fund quotes, with rise/fall per day (or closing price of the last business day); major index funds rise/fall per day (or closing price of the last business day); alerts when a stock rises above/falls below a certain price; earnings announcements for personalized stocks; after hours stock quotes for personalized stocks; stock split information; developments about specific stocks (including upgrades/downgrades, developments, press releases, etc.); personalized portfolio rise/fall over the course of the week/month/year; and total portfolio value.

According to one embodiment, the after hours market is tracked. In this case, the displays are updated accordingly to indicate that the price and stock information relates to the after hours market.

The user chooses which indices, stocks, and funds to track. If the user chooses not to track any major indices or individual stocks or funds, then the Stocks channel is not shown on the device. In addition to the stocks of a user's choosing, the user can also optionally track the following major market indices: Dow Jones Industrial Average Composite; Nasdaq Composite; American Stock Exchange Composite; Standard & Poor's 500 (S&P 500); S&P TSE Composite (Toronto Stock Exchange); and Venture ($CA:ISPVX)

The details mode (1250) includes two different views. The first view includes a five day bar chart along with a timestamp (or "Closed" for the closing price), the price; and the day's High/Lo price. The line graph shows the closing price of the last four trading days along with the current stock when available.

The second view in the details mode includes a timestamp (or "Closed" for the closing price); the latest price; the value change for the day; the percent (%) change for the day; and the volume, except for the indices.

The line graph is designed to show graphically the relative price fluctuation over a five (5) day period, starting with the current day's current price and graphing backwards the four (4) previous business days' closing prices. Time is plotted along the horizontal access and relative stock price change along the vertical axis, where the axis is the previous day's closing price. The horizontal line is labeled with the previous day's closing price. Data points are labeled with the day above the chart. The device stores the previous four closing prices in order to create the graph.

According to one embodiment, the device does not expire quotes that are out of date. When the quotes are no longer current, the view is shown with the date the quote was obtained. For example header 1232 shows a quote that was obtained on Thursday. The following chart illustrates how the quotes are displayed based on when the quote was obtained.

| Today/ Last Quote | Closing Today | Sometime Today | Yesterday | 2 days ago | >this week (resets on Monday) |
|---|---|---|---|---|---|
| Saturday/ Sunday | (Friday close) Not Old | (Friday) "As of Friday" | (Thursday) "As of Thursday" | "As of <day of week>" | "As of <date>" |
| Monday after 9:30 AM | Not Old | Not Old | (Friday) "As of Friday" | (Thursday) "As of Thursday" | "As of <date>" |
| Tuesday after 9:30 AM | Not Old | Not Old | "As of Monday" | "As of <date>" | "As of <date>" |
| Wednesday after 9:30 AM | Not Old | Not Old | "As of Tuesday" | "As of Monday" | "As of <date>" |
| Thursday after 9:30 AM | Not Old | Not Old | "As of Wednesday" | "As of Tuesday" | "As of <date>" |
| Friday after 9:30 AM | Not Old | Not Old | "As of Thursday" | "As of Wednesday" | "As of <date>" |

Figure 13:
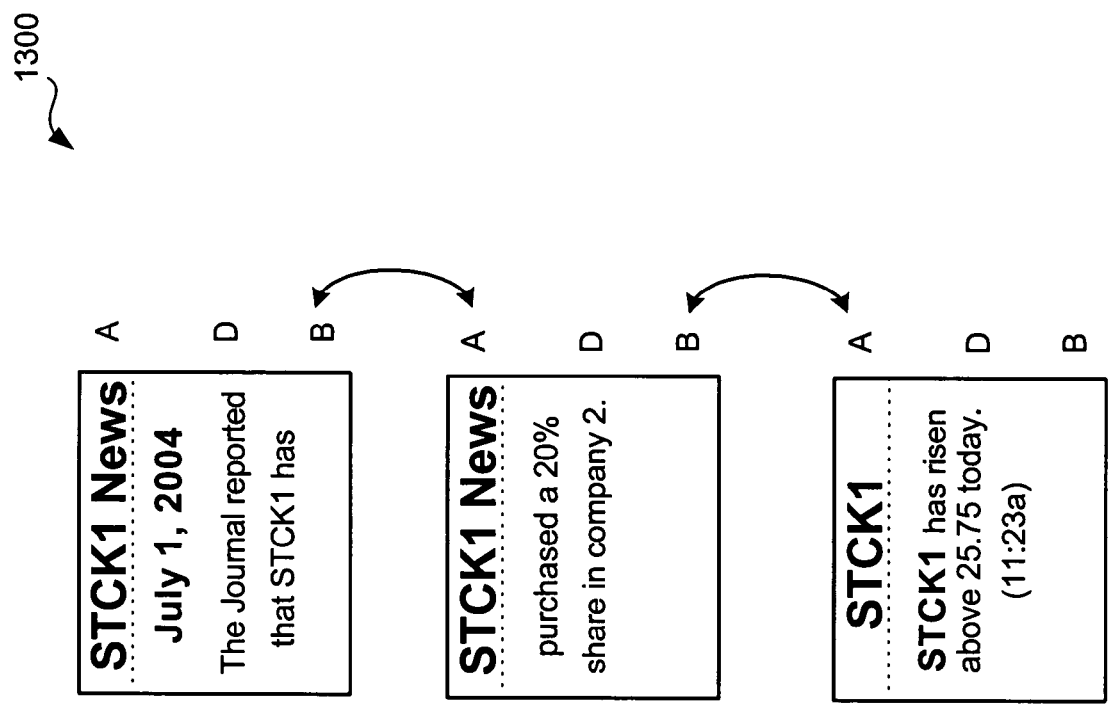
FIG. 13 illustrates key development views for a stock.

FIG. 13 illustrates key development views for a stock, in accordance with aspects of the invention. According to one embodiment, after the two-page details quote (See FIG. 12), key developments for that stock are displayed to the user. As illustrated the key developments are arranged in reverse chronological order with the most recent development first. The developments include items such as: press releases or other newsworthy items such as earnings announcements (including warnings); upgrades/downgrades of stocks or funds by major brokerage houses; stock split announcements, and the like.

Figure 14:
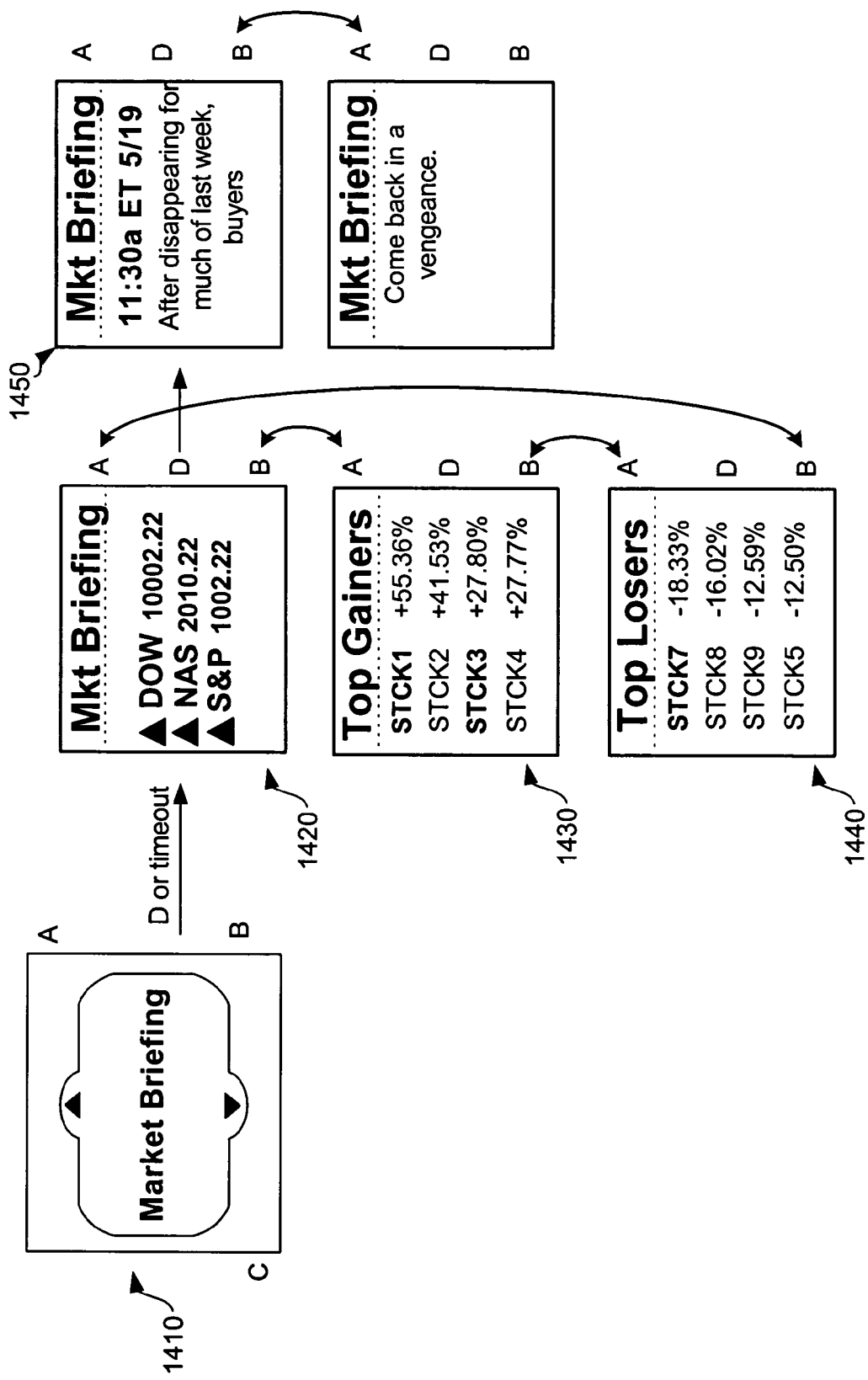
FIG. 14 shows a market briefing mode.

FIG. 14 shows a market briefing mode, in accordance with aspects of the invention. Generally the market briefing mode is designed to show the user general market updates throughout the day including the top gainers and losers. Market briefing mode may include market briefing splash-screen 1410 when activated.

The Market Briefing mode includes a glance view (1420, 1430 and 1440) and a details view (1450). The glance view shows the three US major indices in a summary view and the top % gainers/losers for the day.

Top gainers screen 1430 shows the top 4 stock gainers by ticker and % gained, sorted in order. Any stocks that are in the user's set of personal stocks to track are bolded. Top losers screen 1440 shows the top losers in the same way as the top gainers. According to one embodiment, the device holds one winners/losers list at a time. When a new list is received, it replaces the previous list.

Figure 15:
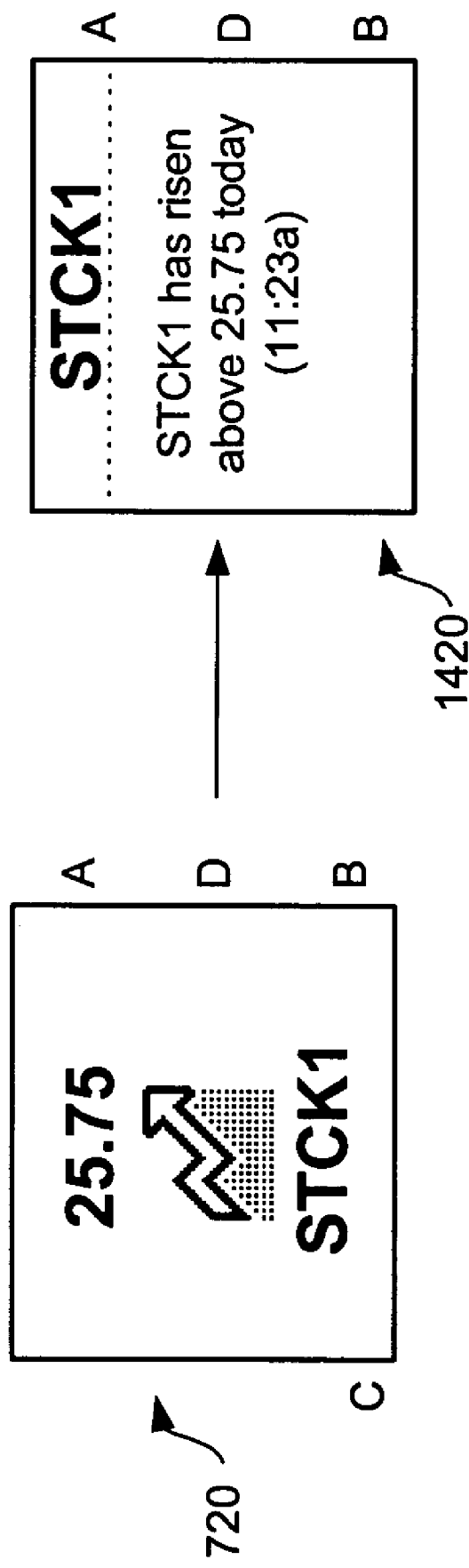
FIG. 15 illustrates alerts.

FIG. 15 illustrates alerts, in accordance with aspects of the present invention. Alerts may be configured by the user. For example, the user can elect to be notified on a per-stock basis if the stock rises/falls more than X % in a day or if the stock/fund crosses a threshold price. According to one embodiment, the alerts are configured through a web page (not shown).

Many different types of alerts may be configured. Some exemplary alerts include: bank balance warnings; nearing credit card limit; recurring payments due; portfolio alerts; and the like.

According to one embodiment, a user receives an alert once per event per day. For threshold alerts, the user is alerted once a day that a stock crosses the threshold. For example, if a user has an alert to notify her when a stock price rises above $55 and the stock fluctuates above and below $55 all day, the user receives that alert once. If the stock closes above $55 and remains above $55 for the next four days, the user will not receive any alerts. However, if the stock falls below and then rises again, crossing $55 on the fifth day, the user will see the alert again.

Selecting the "D" button navigates the user to detail mode for the alert showing the alert.

Stock Channel Customization

Figure 16:
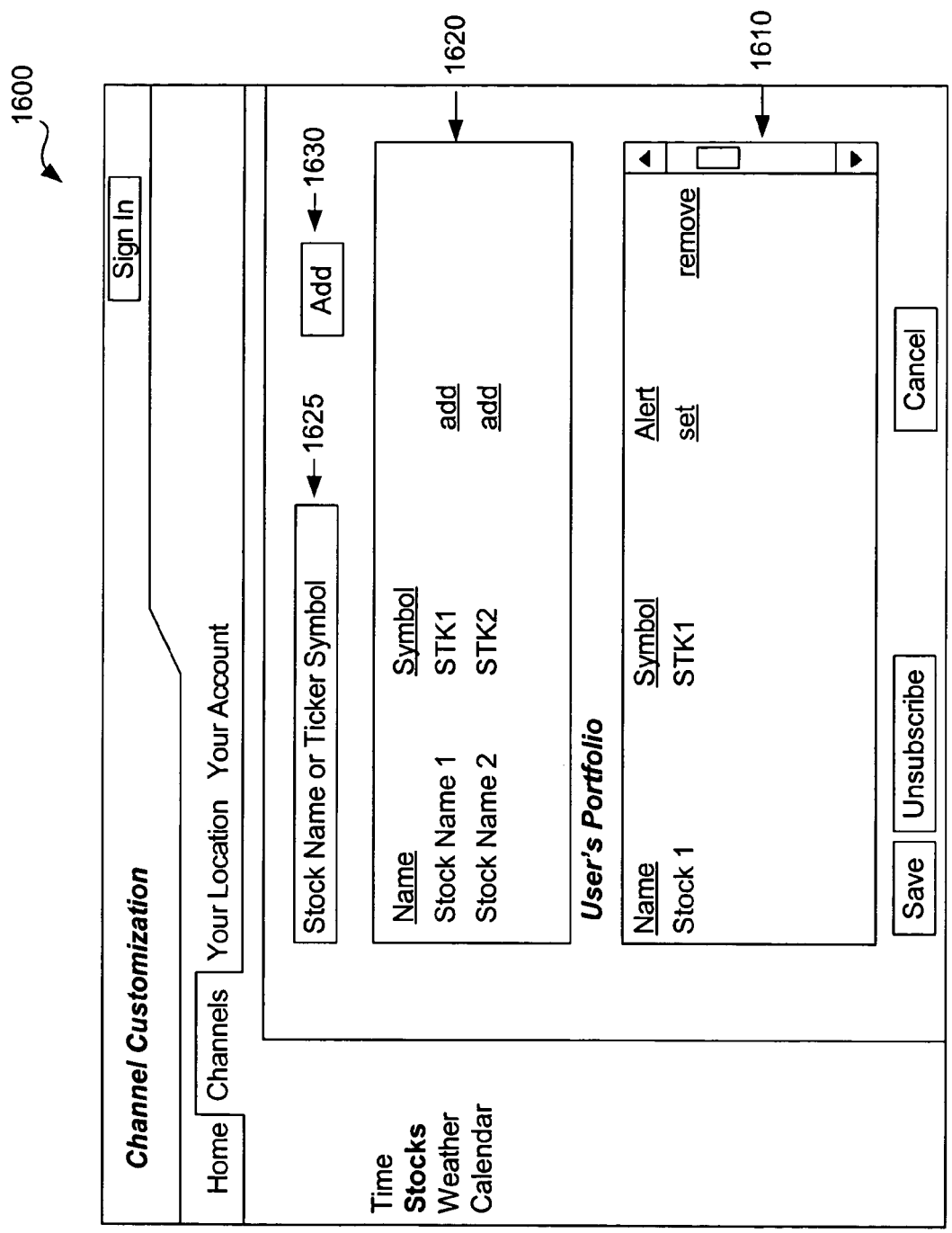
FIG. 16 illustrates a web user interface for inputting user preferences for a stocks channel.

FIG. 16 illustrates a web user interface for inputting user preferences for a stocks channel, in accordance with aspects of the invention.

Stocks can be selected via a computer type interface such as through an internet based application, a computer based application, or any other reasonable method of accessing and altering configuration information. In one embodiment, a subscriber to the stocks channel can accesses web page 1600 to select or change various features associated with the movie channel. In another embodiment, stocks already selected on a user's Internet home page may be retrieved from the user's home web site and then used to populate the stocks (1610). According to one embodiment, the user may select a predetermined number of the top 1,000 stock symbols to track. According to one embodiment, the user may select 15 stocks to track. New tickers may be added without having to change any code on the device or alter the device configuration.

According to one embodiment, the user can type any name or ticker symbol for US or Canadian stocks in box 1625. Other markets may also be supported (e.g. Japanese, European, and other markets). The user can add multiple stocks or company names by separating them with a comma or a semi-colon. Once the user has entered the name and ticker symbol they select the add button which initiates a search for the stock. If the search result returns a unique hit, then the returned ticker is added to list 1610 and that part of the search text is cleared from the text input box 1625.

If the user queries for company names or tickers that return multiple results, those results are shown in the lookup results control list 1620. The items are sorted alphabetically by company name. The user can add a stock by clicking on the "Add" link. Once the user clicks on the add link, the ticker is moved to list 1610.

Encoding

Figure 17:
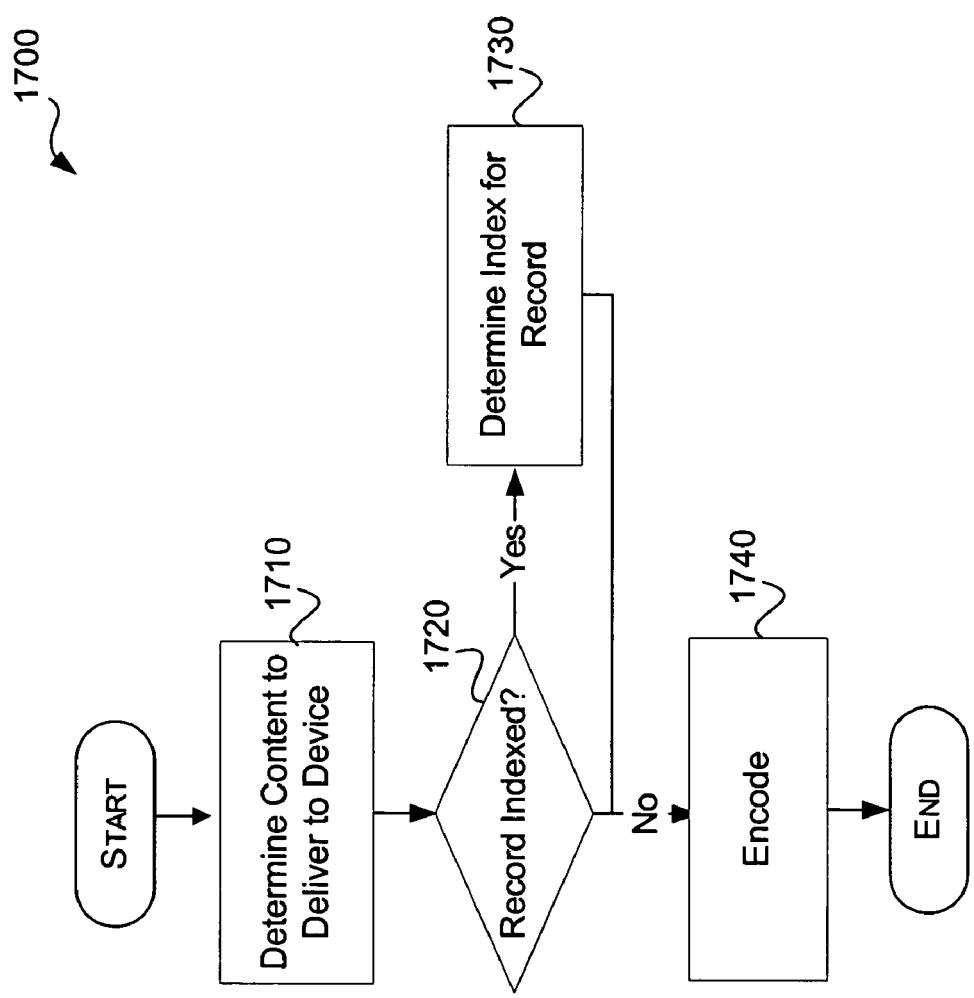
FIG. 17 illustrates encoding data, in accordance with aspects of the present invention.

FIG. 17 illustrates encoding data, in accordance with aspects of the invention. After a start block, the process moves to block 1710 where a determination is made as to what content is going to be delivered to the device.

Moving to decision block 1720, a determination is made as to whether the data record is part of an index. Generally, any information that is static and that is broadcast multiple times is encoded as an index. For example, stocks are encoded as part of an index, such that each stock name does not need to be delivered to the device each time the sign is referenced. Indexing the content dramatically cuts down the amount of data that needs to be broadcast. The content is indexed by assigning an ID to each name that remains static. According to one embodiment, the index starts at one and ends at the last stock name. The names and their associated IDs are delivered to the device in a configuration message such that when the device receives a stocks broadcast the device may associate the ID with the stock name.

When the record is encoded as an index, the process moves to block 1730, where the index value is determined for the record.

When the record is not encoded as an index, the process moves to block 1740, where the record is encoded. According to one embodiment, the value of the record is stored within a predetermined number of bits. For example, a year may be encoded in x number of bits whereas a description may encoded in more bits.

The following is an exemplary encoding for the stocks channel:

| Value | Description (range of values) | Encoding | Bytes |
|---|---|---|---|
| Ticker symbol | Stock symbol (usually fewer than 5 chars) | Index | 0 bytes |
| Price | $0.01 to over $70,000 (for Berkshire Hathaway) | Int value, in cents | 3 bytes |
| Timestamp | Stock quote timestamp | Sent once per packet; each stock from an Exchange has the same timestamp | 0 bytes |
| Price change | Some fraction of the price of the stock | Int value, in cents unless the stock value is more than $1k, then the price change is in dollars, not cents | 2 bytes |

-continued

| Value | Description (range of values) | Encoding | Bytes |
|---|---|---|---|
| % change | % change in the stock value for the day (0-100%, positive or negative) | Not sent - calculated based on price and Price change | 0 bits |
| Daily High/ Low | Two prices | Int value as differences in the current price (The Hi/Lo values are encoded in DOLLARS if the current price > 1000 (otherwise, in cents)) | 4 bytes (2 bytes each) |
| 5 day chart | 5 day chart of 4 previous days' closing prices and today's current price | Not sent - the watch records 4 days' closing prices history. | 0 bits |
| Volume (for stocks/funds only) | Number of shares traded that day (range is 100K-100 MM) | Sliding value (1k increments below 1 M, and 100k increments above 1 M) | 2 bytes These bytes are used to help encode price change in indices, in addition to the two bytes allocated above |

Operating Environment

Figure 1:
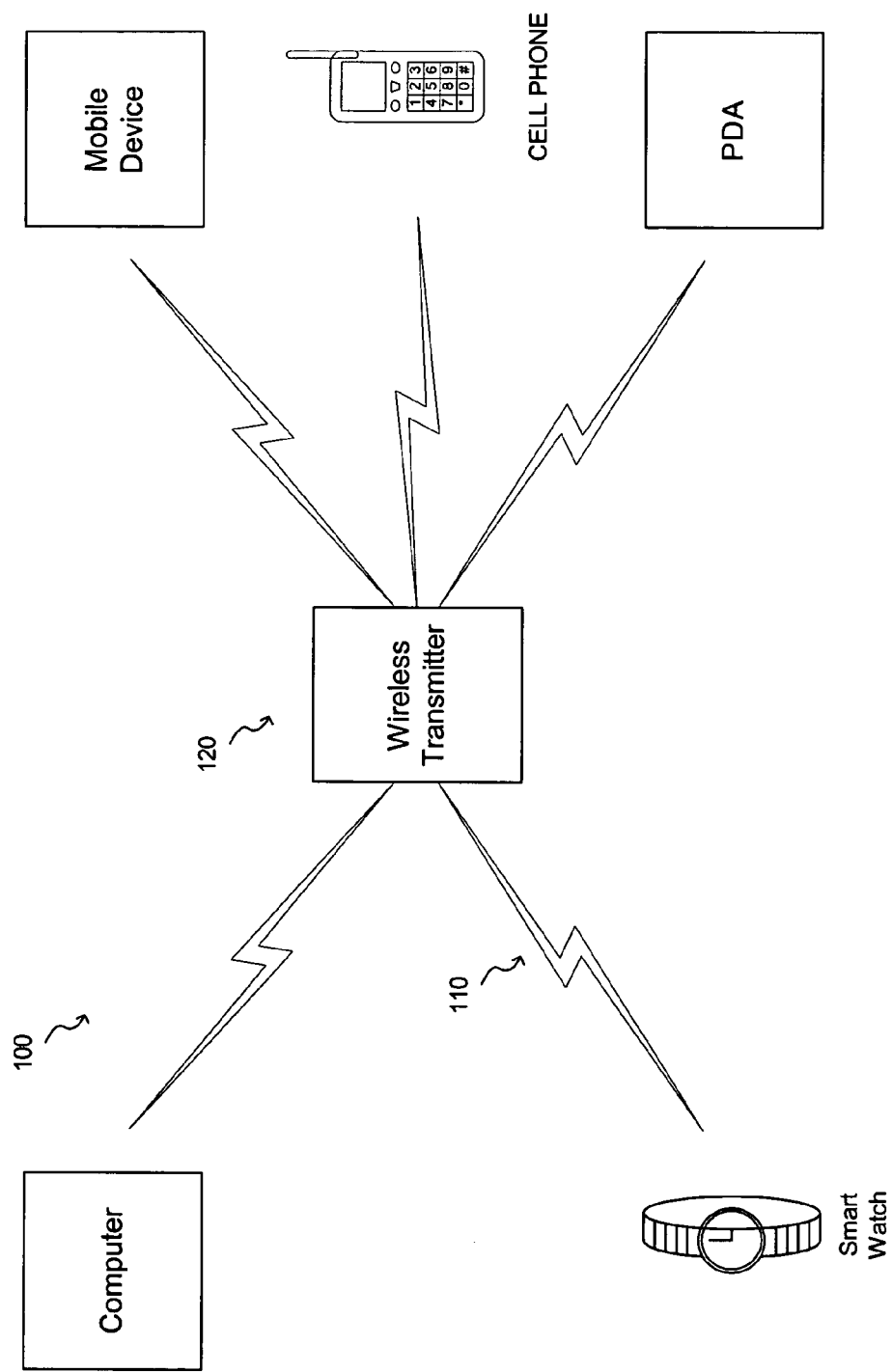
FIG. 1 illustrates an operating environment.

FIG. 1 illustrates an example operating environment for the present invention. As illustrated, operating environment 100 includes wireless transmitter 120 that is responsible for delivering content to wireless devices. According to one embodiment, the wireless transmitter may include a cellular tower that is used to communicate with mobile devices, such as cell phones, notebooks, pocket PCs, long-distance communication links, and the like. According to another embodiment, the wireless transmitter may include an FM transceiver that broadcasts signals over communication channel 110 to the various electronic devices. The FM broadcast may be any number of types including but not limited to: a standard FM transmission, a sub-carrier FM transmission, or any other type of FM transmission as may be desired. Example electronic devices that have an FM receiver or transceiver may include a desktop computer, a watch, a portable computer, a wireless cellular telephone (cell phone), and a personal data assistant (PDA). The electronic devices are arranged to receive information from the wireless broadcast.

Some example electronic devices that may include an electronic system arranged to operate according to the interaction model are illustrated in FIG. 1. Each of the electronic systems receives messages/information over the communication channel.

According to one embodiment, each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel)

entry numbers. For example, a particular electronic device is configured to receive a selected group of channels from the available channels. The message packets associated with each of those channels is received, processed, and stored in the client device. The stored message packets can be reviewed using a user interface that employs an interaction model, in accordance with the present invention.

Example channels include: a stocks channel, a news channel, a sports channel, a time channel, a messages channel, a calendar channel, a weather channel, and a movies channel. Messages associated with each channel include message content that is based on the particulars of the channel.

FIG. 2 is a schematic diagram illustrating functional components of an illustrative electronic device that may be used to interact with channel content, in accordance with aspects of the invention. Electronic device 200 includes processor 260, memory 262, display 228, and user interface 232. Memory 262 generally includes both volatile memory (e.g., RAM) and non-volatile memory (e.g., ROM, Flash Memory, or the like). Electronic device 200 may include an operating system 264, such as the Windows CE operating system from Microsoft Corporation or another operating system, which is resident in memory 262 and executes on processor 260. User interface 232 may be a series of push buttons, a scroll wheel, a numeric dialing pad (such as on a typical telephone), or another type of user interface means. Display 228 may be a liquid crystal display, or any other type of display commonly used in electronic devices. In one example, display 228 may be touch-sensitive that would act as an input device.

One or more application programs 266 are loaded into memory 262 and run on the device. Examples of application programs include stock programs, news programs, time programs, and so forth. Electronic device 200 also includes non-volatile storage 268 that is located within memory 262. Non-volatile storage 268 may be used to store persistent information which should not be lost if electronic device 200 is powered down. Applications 266 may use and store information in storage 268, such as stocks content used by a stocks application, appointment information used by a calendar program, and the like.

Electronic device 200 includes power supply 270, which may be implemented as one or more batteries. Power supply 270 might further include an external power source, such as an AC adapter or a powered docking cradle that supplements or recharges the batteries.

Electronic device 200 is also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived content. Electronic device 200 can control each alert mechanism separately (e.g., audio, vibration, as well as visual cues).

Electronic device 200 also includes a communication connection, such as radio interface layer 272, which performs the function of receiving and/or transmitting radio frequency communications. Radio interface layer 272 facilitates wireless connectivity for electronic device 200. Transmissions to and from radio interface layer 272 are conducted under control of the operating system 264. In other words, communications received by radio interface layer 272 may be disseminated to application programs 266.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

In one example of the present invention, electronic device 200 is a mobile electronic device such as a watch device that includes a wireless interface. An exemplary watch device is shown in FIG. 3.

Broadcast Channels

Figure 4:
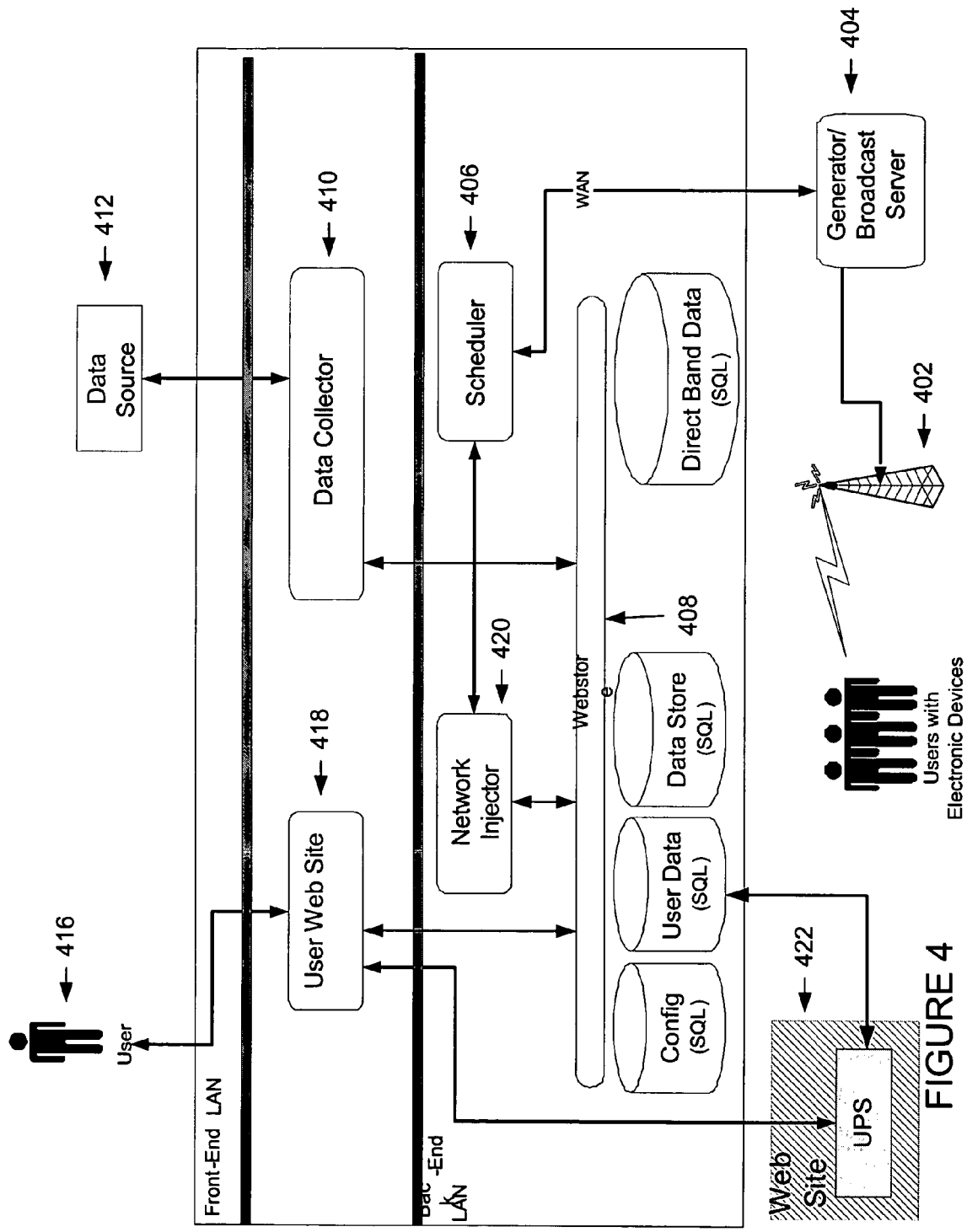
FIG. 4 illustrates a system for delivering and configuring channel information to an electronic device.

FIG. 4 illustrates a system for delivering and configuring channel information to an electronic device, in accordance with aspects of the invention.

A user, such as user 416, may customize their channels through user web site 418. Using website 418 the user may set options and select information associated with channels to which they have subscribed. For example, the user may select the stocks which are provided to the electronic device. The selected options are stored in a data store, such as webstore 408. Channel information and various options may also be automatically retrieved from a web site to which the user participates in. For example, web site 422 may be the user's home page in which the user has already selected various options customizing their page. These options may be used to populate the options associated with various channels. For example, a user's tracked stocks may be used in a stocks channel, a user's selected cities may be used in a weather channel, the user's selected theaters may be used in a movies channel, a user's news sources may be used in a news channel, and the like.

Data Collector 410 is configured to collect data from one or more data sources, such as data source 412, relating to a channel. For example data collector 410 may retrieve US stock information from one data source, and Canadian stock information from another data source.

According to one embodiment of the invention, the data collector queries the various news sources in round robin order every 15 minutes. All of the new contents from each feed are then dropped into the message queue. According to another embodiment, the news stories are load leveled across categories such that all of the stories from one category do not necessarily get broadcast as a group.

The objective of load leveling is to spread the stories out throughout the day. Each story is associated with a priority tag, which relates to a priority of the story. Stories with a higher priority are scheduled to be broadcast first. Other stories can be delayed from going into the message queue to balance the loading over the day. The rate of sending out new stories will depend on the volume of new content for each feed. While new stories may be captured every 15 minutes, each story is not broadcast each time. The following table shows a typical volume of news stories from various news sources.

| Average daily Volume | Feed Name | Number of stories from each retrieval |
|---|---|---|
| 55 | AP - Business—Business | 6 |
| 10 | AP - Entertainment—Entertainment | 2 |
| 90 | AP - International-World/Intl | 10 |
| 54 | AP - Sports—Sports | 6 |
| 110 | AP-Headline/General | 12 |
| 3 | bizjournals.com-Business | 2 |
| 3 | Business Week-Business | 2 |
| 1 | CNBC-Business | 1 |
| 9 | Front Page News-Headline/General | 2 |
| 16 | MSNBC Business News-Business | 3 |
| 4 | MSNBC Entertainment news-Entertainment | 1 |
| 1 | MSNBC Family News-Home & Family | 1 |
| 5 | MSNBC Health—Health | 1 |
| 6 | MSNBC International-World/Intl | 2 |
| 46 | MSNBC Living News-Living | 6 |
| 8 | MSNBC Stock Market News-Business | 2 |
| 21 | MSNBC Technology—Technology | 5 |
| 6 | MSNBC Travel—Travel | 2 |
| 2 | MSNBC Travel—Travel/Business Travel | 1 |
| 1 | MSNBC Travel—Travel/Travel Security | 1 |
| 16 | NBC Sports (aka MSNBC Sports)-Sports | 3 |
| 4 | News Across America (Affiliates)-Headline/General | 1 |
| 84 | Reuters - Business—Business | 12 |
| 14 | Reuters - Entertainment—Entertainment | 3 |
| 155 | Reuters - International-World/Intl | 20 |
| 2 | Reuters - Science-Technology | 1 |
| 1 | Reuters - Space-Technology | 1 |
| 31 | Reuters - Sports—Sports | 6 |
| 11 | Reuters - Technology—Technology | 2 |
| 8 | Reuters - Variety-Entertainment | 2 |
| 16 | Reuters - Headline/General | 3 |
| 4 | Space.com-Technology | 1 |
| 20 | Sporting News-Sports—Sports | 4 |
| 14 | Top Stories-Headline/General | 3 |
| 2 | Top Weather Stories-Weather | 1 |
| 4 | Washington Post-Headline/General | 1 |
| 1 | WebMD-Health | 1 |

Stories are transmitted for 24 hours after they arrive in the system for the first time.

The data feed for the stocks channel includes information such as: stock/fund quotes that include ticker symbol; a price with timestamp; amount changed; daily high/low; volume. Major index fund quotes include items such as: ticker symbol; price with timestamp; amount changed; daily high/low; and ratio of advancers to decliners.

Intra-day Market Briefings include items such as: top % winners and losers for the US and Canadian markets; developments about stocks categorized per stock including upgrades/downgrades, developments, press releases, etc.; earnings calendar; stock split announcements and other investment alerts categorized per stock.

The server broadcasts new quotes if the "last traded" timestamp on the quote is today. Otherwise, the server indicates that the quote is not new. This helps the device deal correctly with holidays and weekends (it won't record a price change).

The stocks data collector collects quotes approximately every 15 minutes during the market day (between the hours of 7:30 AM to 5 PM EST M-F) and once an hour during other times.

If a ticker is delisted, the data collector automatically fills the data in its slot in the data stream with all zeros and the client does not update the value on the watch.

The server then automatically sends a new configuration message to all devices who had subscribed to that ticker, removing the ticker from their devices and from their subscribed stocks list on the website. The slot in the broadcast stream continues to be filled with zeros until the product team decides to reuse a slot. According to one embodiment, the slots remain empty for a period of time before they are reused. If a ticker is just going to be added, it can be added onto the end of a stream at any time without any code change or configuration messages. If a ticker symbol has changed, users who tracked these stocks still track the stock, but they have a new ticker symbol that is broadcast to the user as part of an updated configuration message. The new ticker is broadcast in the same index location.

Data collector 410 may store the data in a data store, such as webstore 408, for later broadcast. According to one embodiment, data store 410 communicates with network injector 420 which then stores the data in webstore 408.

Broadcast transmitter tower 402 is arranged to provide a communication signal that is configured for reception by users with electronic devices that are located within a service region. Broadcast tower 402 transmits in response to generator/broadcast server 404. Generator 404 may communicate with scheduler 406 via a network communication link. Scheduler 406 is configured to schedule broadcast transmissions relating to channel information. The stocks data may be broadcast more frequently during the times the market is open. The device can also receive data and determine how long the data is valid. This information may be included in the application on the device, or encoded in the data sent to the device. This helps the device save resources by not having to repeatedly download the same data. Selected services are entered in a database, such as webstore 408 for broadcast transmission at a later time. At the designated time (or time interval) scheduler 406 communicates with broadcast server 404 to begin a transmission sequence of data for the selected services. Broadcast server 404 converts the data to the appropriate format for transmission (i.e. an FM signal) and relays it to broadcast tower 402. In an alternative example, scheduler 406 communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region receives the shared and personal messages. Personal messages, however, may only be decoded by a single client.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust any time related information. Moreover, the time and date functions of the client device may be synchronized based on information that is included in the broadcast transmissions.

According to one embodiment, stock names change fairly rarely and therefore are sent by broadcast server 404 as part of the configuration of the stocks channel on the electronic device. The electronic device stores the name and corresponding ID of the stock such that when it receives a stocks broadcast transmission the device may match the ID with the name of the stock. Whenever a stock name changes a configuration message is prepared and sent to users who have selected that stock. Alternatively, the stock names may be included in a broadcast stream.

Process Flow

Figure 5A:
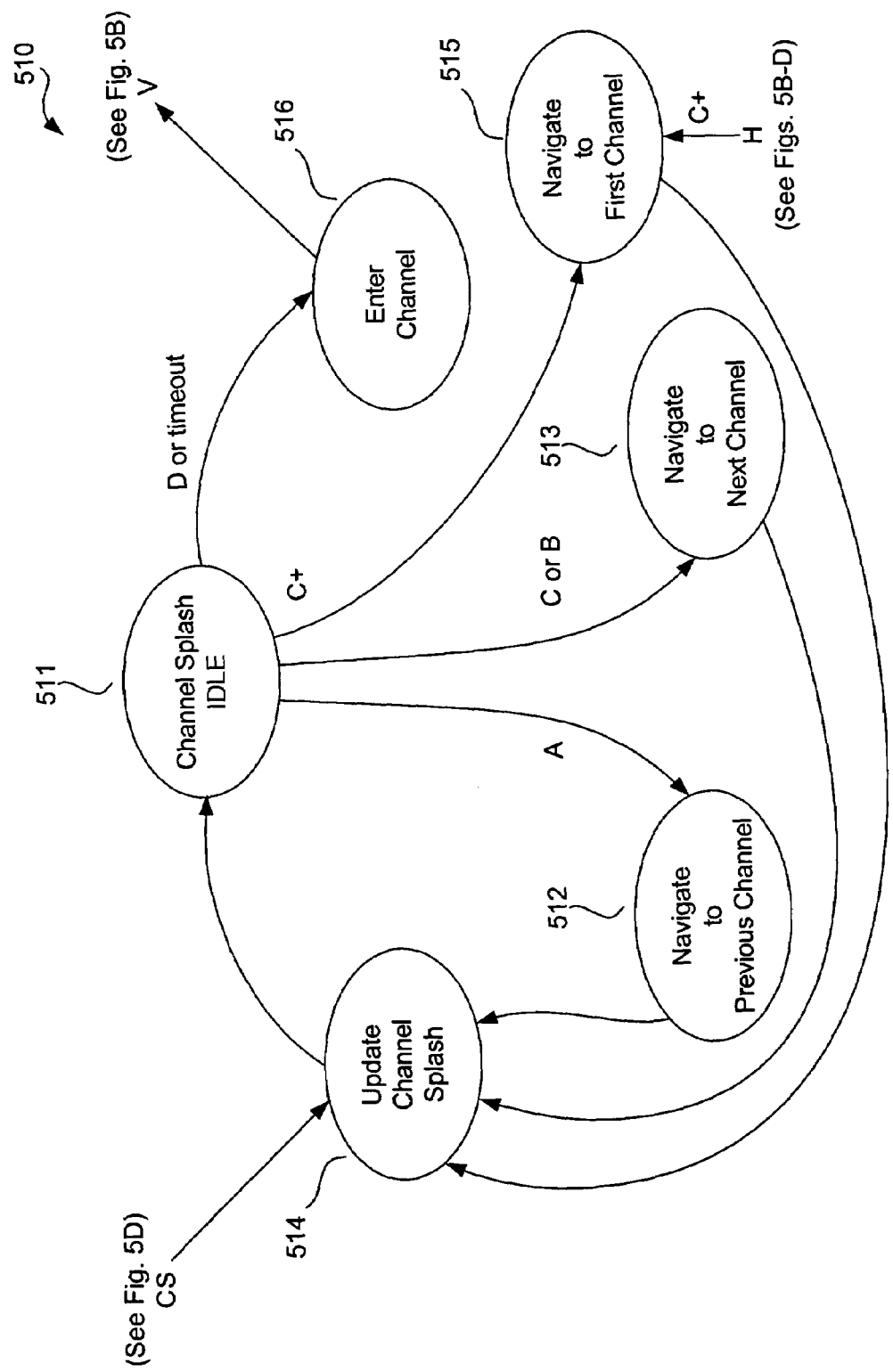
FIGS. 5A-5D illustrate process flows for passive and active navigation functions of a electronic device.
Figure 5B:
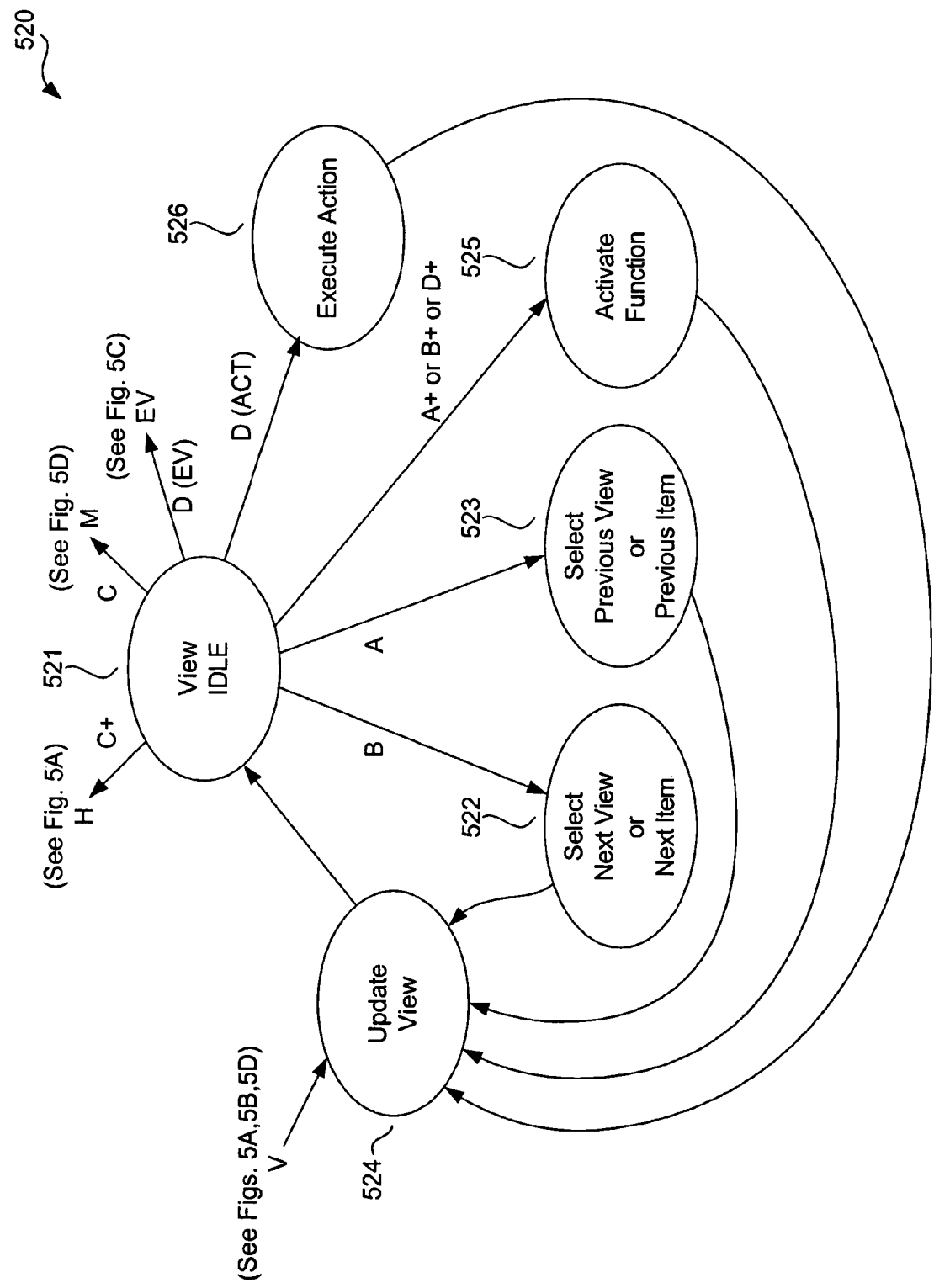
Figure 5C:
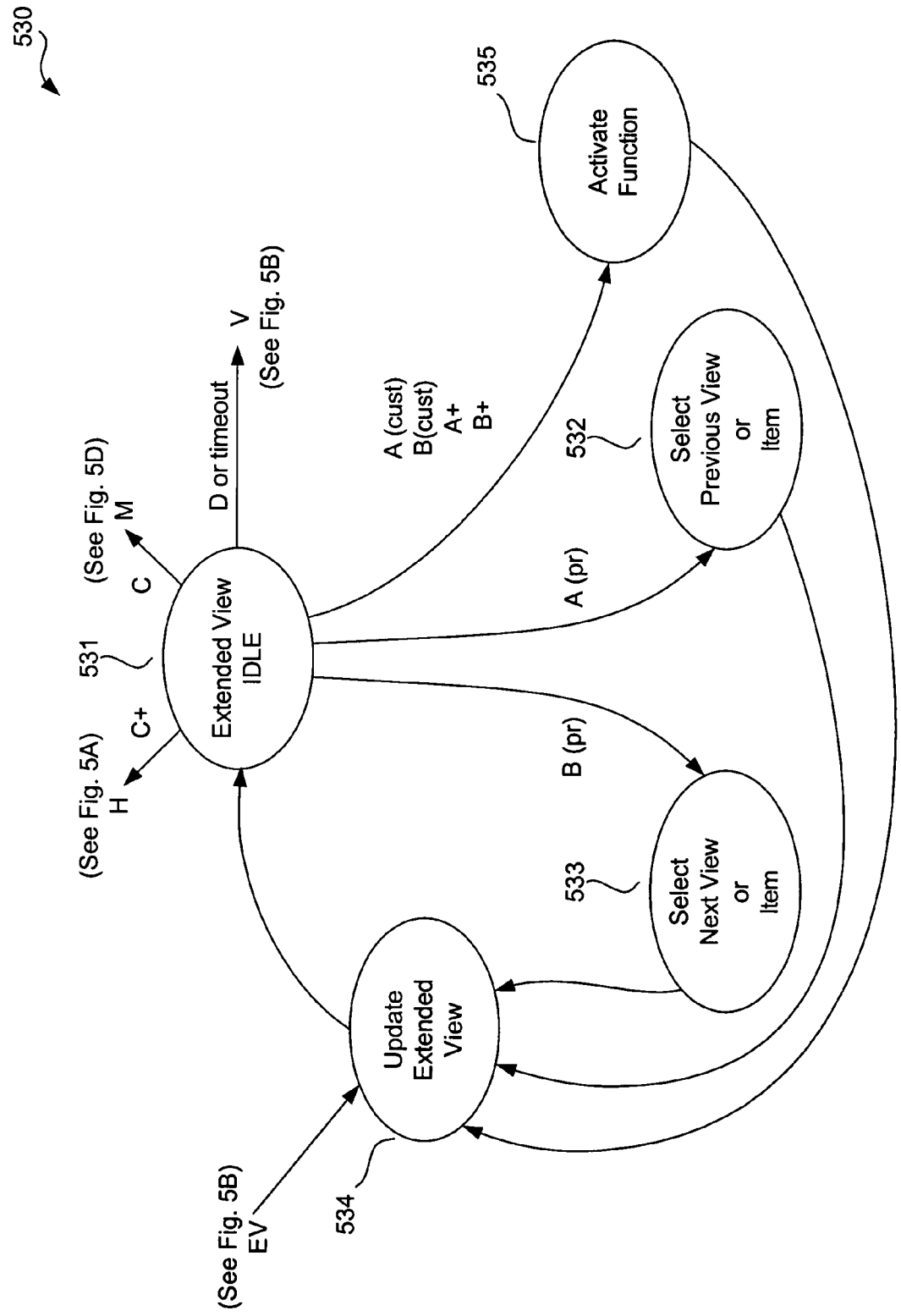
Figure 5D:
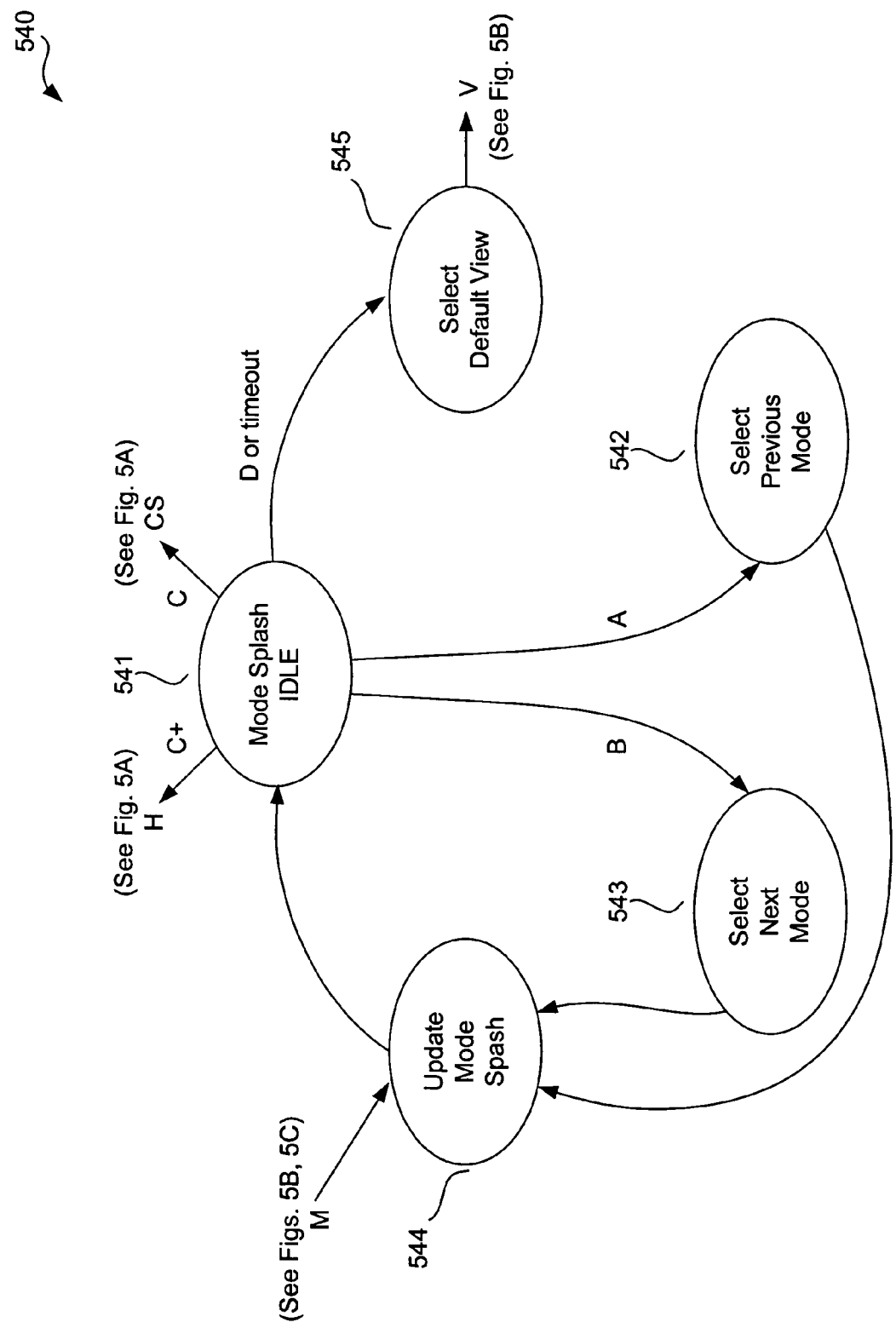

Process flow diagrams for navigation function of an example electronic device are illustrated in FIGS. 5A-5D. The process flow diagram illustrated in FIG. 5A is predominately focused on channel splash activity. The process flow diagram illustrated in FIG. 5B is predominately focused on view activity. The process flow diagram illustrated in FIG. 5C is predominately focused on extended view activity. The process flow diagram illustrated in FIG. 5D is predominately focused on mode splash activity.

Every electronic device has at least one channel that corresponds to the home channel. For a watch type of device, the home channel corresponds to a time channel. However, different home channels can be assigned to every electronic device. Whenever the currently selected channel corresponds to the home channel, the previous channel corresponds to the last channel (if more than one channel exists on the device). Similarly, the next channel corresponds to the home channel when the current channel is the last channel in the channel list for the electronic device.

Every electronic device has a set of selectors (or buttons) that are selectively activated to navigate various functions in the device. Example selectors are illustrated in FIG. 3. For the purposes of the discussion below, each selector is indicated by a letter such as "A", "B", "C", "D", and "E". Some alternate selector functions may be chosen by sustained activation of a selector button for a predetermined time interval (e.g., two seconds). The alternate selector functions are generally indicated in the figures by a "+" symbol that is adjacent to the selector functions' designating letter (e.g., "C+").

The example electronic device described below includes at least four selectors as indicated by letters "A", "B", "C", and "D". The "E" selector may be arranged to provide additional functions such as backlighting, a back channel selector, as well as any other desired function. Additional extended functions may also be programmed and accessible through multiple selector combinations. For example, one function could be selected by holding the "D" and "A" selectors together ("D+" & "A+") for a predetermined time interval. Additional extended functions can also be programmed using other selector combinations such as "D+" & "B+", "A+" & "B+", as well as others.

Channel Splash Operating State

The channel splash operating state is described as follows below with reference to FIG. 5A.

The electronic device has a default initial channel that is referred to as a home channel. The display is updated to indicate the currently selected channel at block 514. Processing continues to block 511 where the channel splash operating state is maintained in an idle state. The electronic system in the electronic device monitors the user interface (e.g., the four selectors) while in the channel splash IDLE state. Processing leaves the channel splash IDLE state when the user activates one or more of the selectors or a timeout has occurred. The display actively maintains the splash screen to indicate the current channel selection while the channel splash IDLE state is active at block 511. Splash screens may include one or more graphic elements and/or text elements. An example channel splash screen for a stocks channel and a news channel is illustrated in FIG. 7. Splash screens may be accompanied by the activation of sound that provides an audible indicator that the channel has changed. The sound associated with the audible indicators may be the same for each channel splash screen, or unique based on either the particular channel or the particular channel type (e.g., news channels are one type, while messages are another type).

Processing flows from channel splash IDLE state 511 to the "navigate up" or "navigate to previous channel" function 512 when the "A" selector is activated.

Processing continues from block 512 to block 514, where the display is updated based on the newly selected channel. After the display is updated, processing returns to channel splash IDLE state 511.

Processing flows from channel splash IDLE state 511 to the "navigate down" or "navigate to next channel" function 513 when either the "B" selector or the "C" selector is activated. Processing continues from block 513 to block 514, where the display is updated based on the newly selected channel. After the display is updated, processing again returns to channel splash IDLE state 511.

Processing flows from channel splash IDLE state 511 to the "navigate to first channel" or "navigate to home channel" function 515 when the "C+" selector is activated. The home channel navigation function can be accessed from any channel of the electronic device. The electronic device navigates to the home channel (e.g., the time channel on a watch device) when the "navigate to home channel" function is activated. Processing continues from block 513 to block 514, where the display is updated based on the newly selected channel (i.e., the home channel). After the display is updated, processing again returns to channel splash IDLE state 511.

Processing flows from the channel splash IDLE state 511 to the "enter channel" function 516 when the "D" selector is activated. Alternatively, the "enter channel" function is activated when the electronic system is maintained in the channel splash IDLE state for a predetermined time interval (e.g., a 2 second timeout) without activation of a selector. Processing flows from block 516 to block 524 (see FIG. 5B) when the "enter channel" function is activated as indicated by "V".

The enter channel function performs a series of initializations in the electronic device prior to leaving the channel splash operating state and entering the channel view operating state. Every channel in the electronic device has at least one operating mode. The electronic device selects the current operating mode as a default mode, and a current view as a default view in the currently selected channel when the "enter channel" function is activated.

Channel View Operating State

The channel view operating state is described as follows below with reference to FIG. 5B.

The electronic device enters the channel view operating state at entry point V, where the selector functions associated with the currently selected channel and operating mode are mapped to the selectors. The display is updated to indicate the currently selected view at block 524. Processing continues to block 521 where the channel view operating state is maintained in an IDLE state. The electronic system in the electronic device monitors the user interface (e.g., the four selectors) while in the view IDLE state. When the user activates one or more of the four selectors, processing leaves the view IDLE state.

The display actively maintains the current view while the view IDLE state is active at block 521. List type views include lists of items that can be selected. Other types of views are simply graphical and/or textual elements that are arranged in a display view. Views may be accompanied by the activation of sound that provides an audible indicator that the view has changed. The sound associated with the audible indicators may be the same for each view (e.g., a beep type of indicator or sound clip), or unique based on the particular view. In one example, an audible indicator is activated when a particular alert notification function is activated.

Processing flows from the view IDLE state 521 to the "previous view" or "previous item" function 522 when the "A" button selector is activated. Processing continues from block 522 to block 524, where the display is updated based on the newly selected view. After the display is updated, processing returns to view IDLE state 521. In one example, the previous view corresponds to the last view when the currently selected view is the first available view in the current mode for the current channel. In another example, the previous view corresponds to an empty view (e.g., "no quotes available", "no news", etc.) when the currently selected view is the first available view in the current mode for the current channel. In still another example, the previous item in a list is highlighted when the "A" selector is activated.

Processing flows from view IDLE state 521 to the "next view" or "next item" function 513 when the "B" selector is activated. Processing continues from block 523 to block 524, where the display is updated based on the newly selected view. After the display is updated, processing again returns to view IDLE state 521. In one example, the next view corresponds to the first view when the currently selected view is the last available view in the current mode for the current channel. In another example, the next view corresponds to an empty view when the currently selected view is the last available view in the current mode for the current channel. In still another example, the next item in a list is highlighted when the "B" selector is activated.

Processing flows from view IDLE state 521 to the "mode splash" function when the "C" selector (e.g., "mode select") is activated as indicated by "M". Refer to FIG. 5D and related discussion for details. Processing flows from view IDLE state 521 to the select home channel splash function when the "C+" selector is activated as indicated by "H". Refer to FIG. 5A and related discussion for details.

The "D" selector is defined within the context of the current channel, mode, and view. The "D" selector may be defined as a "delete" function, and "enter extended view" function, a "select" function, or an "execute action" function. Not every view in a given channel/mode has an extended view as may be indicated by a null value. Some views may have an action function that is defined within the context of the view in the currently selected mode/channel. The context for each view is assigned to the mode upon entry into the mode for the current channel.

Processing flows from the view IDLE state 521 to the "enter extended view" function when the "D" selector is activated and the extended view is available as indicated by "D(EV)". The extended view is available when defined within the context of the currently selected view. For example, the extended view may be available for a list type view such that the highlighted list item is selected when the "D" selector is activated, and a detailed view associated with the highlighted item is displayed as an extended view. Refer to FIG. 5C and related discussion for details on the extended view processing.

Processing flows from view IDLE state 521 to the "execute action" function at block 526 when the "D" selector is activated and the action function is available as indicated by "D(ACT)". The action function is defined within the context of the currently selected view. For example, a fortune cookie mode may be available in an entertainment channel. Although the fortune cookie mode may only have a single view, the "D" selector may be mapped to an action function that randomly selects fortunes from a list when the "D" selector is activated. After the action is performed (e.g., retrieve random fortune from list, execute an animation sequence), processing continues to block 524 where the display is updated as previously described.

Other special functions may be mapped to the "A+", "B+", and "D+" selectors within the context of the current view. By activating the corresponding selector for a predetermined time interval (e.g., 2 seconds) the corresponding special function is activated as indicated by block 525. Processing continues from block 525 to block 524 where the display is updated as previously described.

In one example, a list browser function is available in a mode that corresponds to movies playing at selected theaters. For this example, activation of the "A" and "B" selectors result in manual navigation through views that correspond to previous or subsequent movies. Activation of the "A+" or "B+" selector may activate a speed browse function.

In another example, a delete function is available in a view that corresponds to a specific news item associated with the news channel. Activation of the "D+" selector may activate a delete function that removes the currently selected movie from the electronic device.

In still another example, processing may flow from view IDLE state 521 to an "alternate view" function when the electronic system is maintained in the channel splash IDLE state for a predetermined time interval (e.g., a 2 second timeout) without activation of a selector. For example, no action for a predetermined amount of time may result in views associated with the channel automatically rotating to other views associated with the channel.

Extended View Operating State

The extended view operating state is described as follows below with reference to FIG. 5C.

The electronic device enters the extended view operating state at entry point EV, where the selector functions associated with the currently selected extended view are mapped to the selectors. The display is updated to indicate the currently selected extended view at block 534. Processing continues to block 531 where the extended view operating state is maintained in an IDLE state. The electronic system in the electronic device monitors the user interface (e.g., the four selectors) while in the extended view IDLE state. When the user activates one or more of the four selectors, processing leaves the extended view IDLE state.

The display actively maintains the current extended view while the extended view IDLE state is active at block 531. Extended views include graphical and/or textual elements that are arranged in a display view. Extended views may be accompanied by the activation of sound that provides an audible indicator that the extended view has changed. The sound associated with the audible indicators may be the same for each extended view (e.g., a beep type of indicator or sound clip), or unique based on the particular extended view.

Processing flows from extended view IDLE state 531 to the "previous view" or "previous item" function 532 when the "A" selector is activated. Processing continues from block 532 to block 534, where the display is updated based on the newly selected extended view. After the display is updated, processing returns to extended view IDLE state 531. In one example, the previous view corresponds to the last extended view when the currently selected extended view is the first available extended view for the current channel/mode. In another example, the previous extended view corresponds to an empty view (e.g., "no quotes available", "no news", no data", etc.) when the currently selected extended view is the first available extended view in the current channel/mode.

Processing flows from extended view IDLE state 531 to the "next view" or "next item" function 533 when the "B" selector is activated. Processing continues from block 533 to block 534, where the display is updated based on the newly selected extended view. After the display is updated, processing returns to the extended view IDLE state 531. In one example, the next view corresponds to the first extended view when the currently selected extended view is the last available extended view for the current channel/mode. In another example, the next extended view corresponds to an empty view (e.g., "no news", "no data", etc.) when the currently selected extended view is the last available extended view in the current channel/mode.

Processing flows from extended view IDLE state 531 to the "mode splash" function when the "C" selector (e.g., "mode select") is activated as indicated by "M". Refer to FIG. 5D and related discussion for details.

Processing flows from extended view IDLE state 531 to the view function when the "D" selector is activated as indicated by "V". In another example, processing flows from extended view IDLE state 531 to the view function when a timeout interval expires (e.g., 5 seconds). Refer to FIG. 5B and related discussion for details concerning the view functions.

Processing flows from extended view IDLE state 531 to the select home channel splash function when the "C+" selector is activated as indicated by "H". Refer to FIG. 5A and related discussion for details.

Special functions may be mapped to the "A'", "B'", "A+", and "B+" selectors within the context of the current view. By activating the corresponding selector for a predetermined time interval (e.g., a 2 second timeout interval) the corresponding special function is activated as indicated by block 535. Processing continues from block 535 to block 534 where the display is updated as previously described.

Mode Splash Operating State

The model splash operating state is described as follows below with reference to FIG. 5D.

The electronic device enters the mode splash operating state at entry point M. The display is updated to indicate the currently selected mode at block 545. Processing continues to block 541 where the mode splash operating state is maintained in an IDLE state. The electronic system in the electronic device monitors the user interface (e.g., the four selectors) while in the mode splash IDLE state. When the user activates one or more of the four selectors, processing leaves the mode splash IDLE state.

The display actively maintains the current mode splash display while the mode splash view IDLE state is active at block 541. Mode splash views include graphical and/or textual elements that are arranged in a display view. Mode splash displays may be accompanied by the activation of sound that provides an audible indicator that the selected mode has changed. The sound associated with the audible indicators may be the same for each mode splash (e.g., a beep type of indicator or sound clip), or unique based on the particular mode selected.

Processing flows from mode splash IDLE state 541 to the "previous mode" function 542 when the "A" selector is activated. Processing continues from block 542 to block 544, where the display is updated based on the newly selected mode. After the display is updated, processing returns to mode splash IDLE state 541. In one example, the previous mode corresponds to the last mode when the currently selected mode is the first available mode for the current channel.

Processing flows from mode splash IDLE state 541 to the "next mode" function 543 when the "B" selector is activated. Processing continues from block 543 to block 544, where the display is updated based on the newly selected mode. After the display is updated, processing returns to mode splash IDLE state 541. In one example, the next mode corresponds to the first mode when the currently selected mode is the last available mode for the current channel.

Processing flows from mode splash IDLE state 541 to the "channel splash" function when the "C" selector (e.g., "channel select") is activated as indicated by "CS." Refer to FIG. 5A and related discussion for details.

Processing flows from mode splash IDLE state 541 to the "select default view" function 545 when the "D" selector is activated. Alternatively, processing may flow from mode splash IDLE state 541 to the "select default view" function 545 when a timeout interval (e.g., a 2 second interval) has expired. Processing continues from block 545 to the channel view operating state as indicated by "V". Refer to FIG. 5B and related discussion for details.

Processing flows from mode splash IDLE state 541 to the select home channel splash function when the "C+" selector is activated as indicated by "H". Refer to FIG. 5A and related discussion for details.

Example Display Screen Partitions

FIG. 6 shows exemplary status indicator headers, in accordance with aspects of the present invention. Example display screen 610 is partitioned into two regions: header region 620 and main body region 630.

Main body region 630 of display screen 610 may include one or more graphical and/or textual information fields that change based on the current context in the current channel, mode, and operating state. In one example context, main body region 630 is a single region for displaying textual information, such as textual information relating to the news channel and/or the stocks channel. In another example context, main body section 610 may include a graphical representation.

Header region 620 of display screen 610 may include one or more graphical and/or textual information fields. The fields may change based on the current context in the current channel, mode, and operating state. In one example context, header region 620 may include three regions: current time field 621 and current date field 622. In another example context, header region 620 may include three regions (650): current time field 621, current date field 622, and status indicator field 623. In still another example context, header region 620 may include information relating to the channel. For example, the stock ticker or news category may be displayed in header region 620.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for receiving, displaying and interacting with channel content on a mobile electronic device, comprising:
   receiving channel content encoded on a communication signal that is automatically broadcast to many electronic devices at the same time, wherein the channel content is related to at least one of news channel content and stocks channel content; wherein the channel content is not personalized when it is broadcast; wherein the channel content is received as records;
   storing at least a portion of the channel content on the electronic device;
   associating the channel content with at least one of a stock channel application and a news channel application on the electronic device;
   filtering the channel content based on pre-defined preferences; wherein the pre-defined user preferences are used to select stock indices to track and individual stocks to track for the stocks channel content and types of news for the news channel content on the mobile electronic device; wherein the filtering is automatically performed on the electronic device after the channel content has been received on the electronic device and wherein the filtering creates personalized content on the electronic device by enhancing the filtered content with additional content that is stored on the mobile electronic device;
   decoding the received records using the channel application; wherein decoding the received records includes associating an index value with an expanded name when one of the records is encoded as an index; wherein stock names are encoded as an index;
   setting a current view associated with the channel; and
   displaying the current view on a display of the electronic device.

2. The method of claim 1, wherein setting the current view further comprises: setting the current view to a stocks view when the channel content is related to stocks channel content and setting the current view to a news views when the channel content is related to news channel content.

3. The method of claim 2, wherein setting the current view to the stocks view, further comprises displaying a quotes view for each of a selected list of stocks.

4. The method of claim 3, further comprising determining when a stock is selected; and in response to the stock being selected showing details associated with the stock.

5. The method of claim 3, wherein setting the current view to the stocks view, further comprises displaying an alert based on at least one condition set by a user relating to the stock.

6. The method of claim 4, wherein the details include at least the following: stock name; stock price; value change for the day; percent change for the day; volume; multi-day historical stock price chart; and news related to the stock.

7. The method of claim 2, further comprising updating the quotes view to reflect the time a quote was obtained.

8. The method of claim 2, wherein setting the current view to the news view, further comprises displaying a news view that includes a news category, a headline and an abstract from at least one news source for a news story.

9. The method of claim 8, further comprising providing access to the full news story to the user through a web page.

10. The method of claim 1, further adjusting the current view based on user preferences.

11. The method of claim 1, further comprising receiving a configuration message indicating what portion of the channel content to store such that the stored channel content is personalized for the device.

12. An apparatus for receiving, navigating, and displaying channel content, comprising:
   a data store;
   a communication connection configured to receive a communication signal including the channel content that is automatically broadcast to a plurality of mobile electronic devices at the same time and store at least a portion of the channel content in the data store, wherein the channel content is related to at least one of news channel content and stocks channel content; wherein the channel content is not personalized when it is broadcast; wherein the channel content is received as records;
   a display;
   a user interface that includes a selector; and
   an electronic system that is arranged to interact with the user interface, the data store, the communication connection, and the display, wherein the electronic system is configured to:
      select news channel content when a news channel is activated;
      select stock channel content when a stocks channel is activated;
      filter the channel content based on pre-defined user preferences; wherein the pre-defined user preferences are used to select stock indices to track and individual stocks to track for the stocks channel content and types of news for the news channel content on the mobile electronic device; wherein the filtering is automatically performed on the electronic device after the channel content has been received on the electronic device and wherein the filtering creates personalized content on the electronic device by enhancing the filtered content with additional content that is stored on the mobile electronic device;
   decoding the received records using the channel application; wherein decoding the received records includes associating an index value with an expanded name when one of the records is encoded as an index: wherein stock names are encoded as an index;
   change the current operating mode in response to the selector;
   select a current view that is associated with the current operating mode; and
   display the current view on the display.

13. The apparatus of claim 12, wherein the electronic system is further configured to activate a stocks list in response to the interface selection device when a stocks mode is active, wherein the stocks list is organized as a list of stocks that are selected based on the pre-defined user preferences, and wherein the selector is configured for selecting one of the stocks in the list.

14. The apparatus of claim 13, wherein the electronic system is further configured to set the current view to show the following when the stocks channel is selected: stock name; stock price; value change for the day; percent change for the day; volume; multi-day historical stock price chart; and news related to the stock.

15. The apparatus of claim 14, further comprising adjusting the list of stocks based on user preferences.

16. The apparatus of claim 13, further comprising updating the current view to reflect the time a quote was obtained such that the current view shows when a quote is out of date and when a quote is current.

17. The apparatus of claim 12, wherein the electronic system is further configured to set the current view to show at least one of the following when the news channel is selected: a category, a headline and an abstract from at least one news source for a news story.

18. The apparatus of claim 17, further comprising adjusting the news sources bases on user preferences.

19. The apparatus of claim 12, wherein the electronic system is further configured to set the current view to show a breaking news item.

20. The apparatus of claim 12, wherein the communication connection is further configured to receive a communication signal including a configuration message that indicates what portion of the channel content to store in the data store such that the stored channel content is personalized.

21. A system for providing and interacting with channel content associated, comprising:
　a data collector configured to collect channel content associated with the following channels: a stocks channel and a news channel;
　a broadcast device configured to broadcast a communication signal including the channel content to a plurality of mobile electronic devices at the same time; wherein the channel content is not personalized when it is broadcast; wherein the channel content includes stock channel content and news channel content;
　a mobile electronic device, having:
　　a data store;
　　a communication connection configured to receive the communication signal and select a portion of the channel content based on a configuration of the mobile electronic device to store in the data store; wherein the channel content is received as records;
　　a display;
　　a user interface that includes a selector; and
　　an electronic system that is arranged to interact with the communication connection, the user interface, the data store and the display, wherein the electronic system is configured to:
　　　filter the channel content based on pre-defined user preferences;
　　wherein the pre-defined user preferences are used to select stock indices to track and individual stocks to track for the stocks channel content and types of news for the news channel content on the mobile electronic device; wherein the filtering is automatically performed after the channel content has been received on the electronic device and wherein the filtering creates personalized content on the electronic device by enhancing the filtered content with additional content that is stored on the mobile electronic device;
　　　decode the received records; wherein decoding the received records includes associating an index value with an expanded name when one of the records is encoded as an index; wherein stock names are encoded as an index;
　　　select a current view associated with a currently selected channel, wherein the channel is selected from at least one of: a news channel and a stocks channel;
　　change the current view in response to the selector; and
　　display the current view on the display.

22. The system of claim 21, wherein the channel content includes the following: stock name; stock price; value change for the day; percent change for the day; volume; multi-day historical stock price chart; and news related to the stock; a headline; and an abstract from at least one news source for a news story.

23. The system of claim 21, wherein the electronic system is further configured to provide a detailed view associated with at least one of: a selected stock and a selected news story.

24. The system of claim 23, wherein the broadcast device is configured to broadcast an FM communication signal.

25. The system of claim 24, further comprising a server configured to receive user preferences associated with users receiving the channel content; wherein the user preferences include preferences related to the following: stocks, indices, news sources, exchanges, and alerts.

26. The system of claim 25, wherein the mobile electronic device is further configured to store only the channel content that matches at least one preference associated with the device.

27. The system of claim 24, wherein the broadcast device is further configured to send stocks names as part of a configuration message.

28. The system of claim 21, wherein the electronic system is further configured to provide a time associated with when a quote was obtained when the channel selected is the stocks channel.

* * * * *